US008561018B2

(12) United States Patent
Kobayashi

(10) Patent No.: US 8,561,018 B2
(45) Date of Patent: Oct. 15, 2013

(54) METHOD OF GENERATING INTERMEDIATE MODULE BETWEEN HIGHER-LEVEL MODULE AND LOWER LEVEL MODULE

(75) Inventor: Masayuki Kobayashi, Anjo (JP)

(73) Assignee: DENSO CORPORATION, Kariya (JP)

( * ) Notice: Subject to any disclaimer, the term of this patent is extended or adjusted under 35 U.S.C. 154(b) by 286 days.

(21) Appl. No.: 13/053,341

(22) Filed: Mar. 22, 2011

(65) Prior Publication Data
US 2011/0239187 A1 Sep. 29, 2011

(30) Foreign Application Priority Data
Mar. 23, 2010 (JP) ................................. 2010-066713

(51) Int. Cl.
G06F 9/44 (2006.01)
G06F 9/45 (2006.01)
(52) U.S. Cl.
USPC ............................ 717/107; 717/136; 717/146
(58) Field of Classification Search
None
See application file for complete search history.

(56) References Cited

U.S. PATENT DOCUMENTS

| 5,313,614 | A | * | 5/1994 | Goettelmann et al. | ........ | 717/138 |
| 5,586,020 | A | * | 12/1996 | Isozaki | ......................... | 717/159 |
| 6,748,588 | B1 | * | 6/2004 | Fraser et al. | ................... | 717/146 |
| 7,058,932 | B1 | * | 6/2006 | Jennings et al. | .............. | 717/138 |
| 8,341,607 | B2 | * | 12/2012 | Stoodley et al. | .............. | 717/140 |
| 2004/0221282 | A1 | * | 11/2004 | Le Metayer et al. | .......... | 717/159 |
| 2007/0088697 | A1 | * | 4/2007 | Charlebois et al. | ............... | 707/6 |
| 2007/0198971 | A1 | * | 8/2007 | Dasu et al. | ..................... | 717/140 |
| 2009/0235238 | A1 | * | 9/2009 | Stoodley et al. | .............. | 717/140 |
| 2009/0271771 | A1 | * | 10/2009 | Fallows | ........................ | 717/137 |

FOREIGN PATENT DOCUMENTS

JP A-2007-226793 9/2007

* cited by examiner

*Primary Examiner* — Insun Kang
(74) *Attorney, Agent, or Firm* — Posz Law Group, PLC

(57) ABSTRACT

A method specifies a group of segmented functions of a plurality of segmented functions obtained by dividing a function of a module to be generated. The specified segmented functions commonalize a structural component of the module. The method classifies the input instructions into a select-input instruction non-inputted depending on an environment and a basic input instruction except for the select-input instruction. The method eliminates a combination of segmented functions in the group, the combination of the segmented functions corresponding to a combination of only the select input instruction non-inputted to the module. The method generates a combination component shared by a combination of the remaining segmented functions in the group, and generates a single component implementing a segmented function unclassified into the group. The method generates the module by linking the combination component and the single component with each other.

11 Claims, 23 Drawing Sheets

FIG. 2
(a)
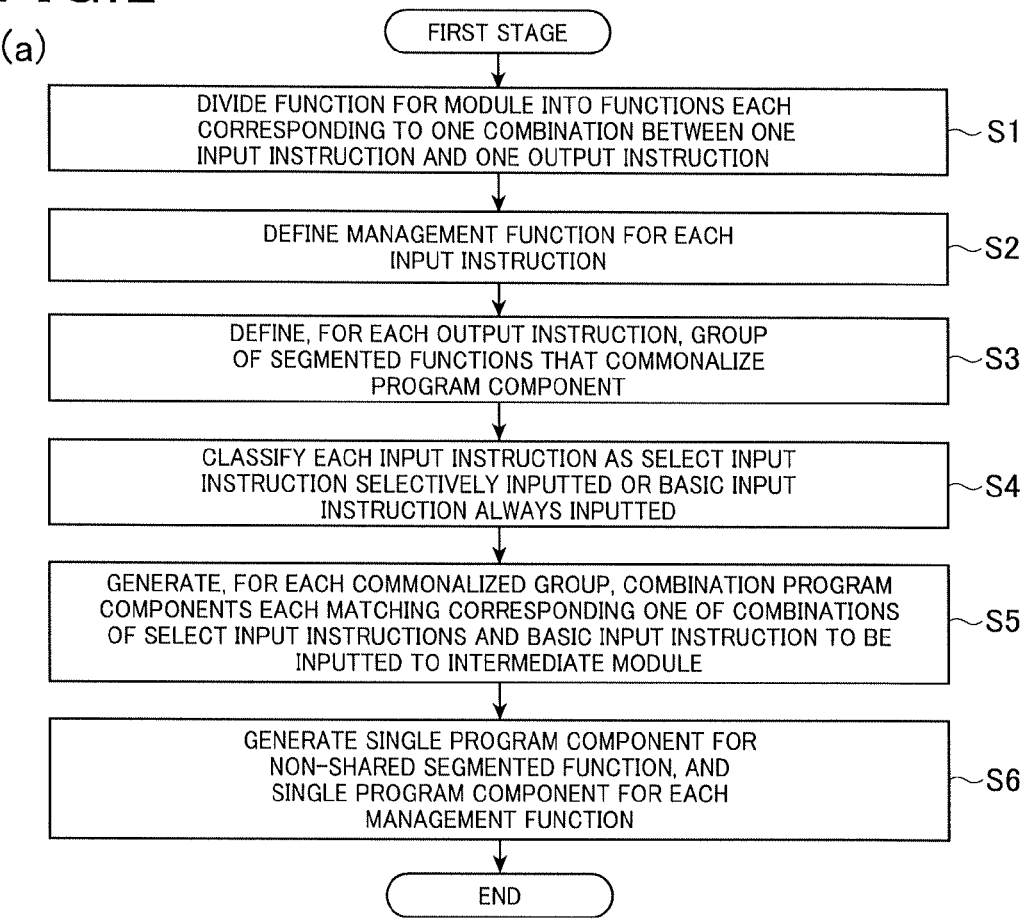
(b)
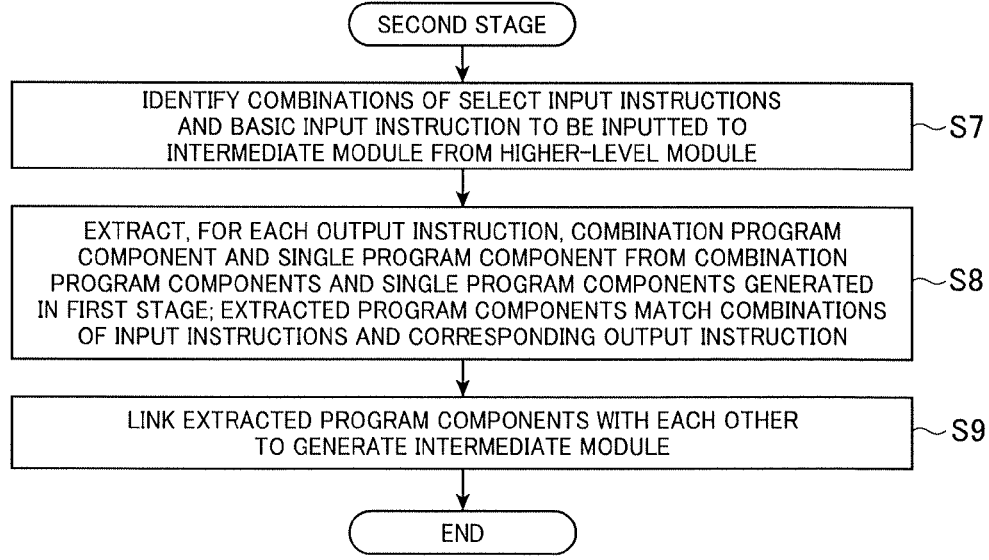

FIG.22

| p-TH GROUP | | r=0 | COMBINATION PATTERN | | | | | | | |
|---|---|---|---|---|---|---|---|---|---|---|
| | | | r=1 | r=2 | r=3 | r=4 | r=5 | r=6 | r=7 | r=8 |
| INPUT INSTRUCTION | q=1 | F2C(p, 1, 1) | 0 | 0 | 0 | 0 | 1 | 1 | 1 | 1 |
| | q=2 | F2C(p, 2, 1) | 0 | 0 | 1 | 1 | 0 | 0 | 1 | 1 |
| | q=3 | F2C(p, 3, 1) | 0 | 1 | 0 | 1 | 0 | 1 | 0 | 1 |

SIXTH COMBINATION PATTERN

TABLE ELEMENT TLCP(p, 2, 8)

⇓ IF INPUT INSTRUCTION I_na(F2C(p, 3, 1)) IS NOT SELECT INPUT INSTRUCTION (IS BASIC INPUT INSTRUCTION)

| p-TH GROUP | | r=0 | COMBINATION PATTERN | | | | | | | |
|---|---|---|---|---|---|---|---|---|---|---|
| | | | r=1 | r=2 | r=3 | r=4 | r=5 | r=6 | r=7 | r=8 |
| INPUT INSTRUCTION | q=1 | F2C(p, 1, 1) | N | 0 | N | 0 | N | 1 | N | 1 |
| | q=2 | F2C(p, 2, 1) | N | 0 | N | 1 | N | 0 | N | 1 |
| | q=3 | F2C(p, 3, 1) | N | 1 | N | 1 | N | 1 | N | 1 |

FIG.24

REGISTRATION INFORMATION OF COMBINATION PROGRAM COMPONENT IN FOURTH COMBINATION PATTERN

REGISTRATION INFORMATION OF COMBINATION PROGRAM COMPONENT IN SIXTH COMBINATION PATTERN

REGISTRATION INFORMATION OF COMBINATION PROGRAM COMPONENT IN SECOND COMBINATION PATTERN

REGISTRATION INFORMATION OF COMBINATION PROGRAM COMPONENT IN EIGHTH COMBINATION PATTERN

| p-TH GROUP | | $r=0$ | COMBINATION PATTERN | | | | | | | |
|---|---|---|---|---|---|---|---|---|---|---|
| | | | $r_1$ | $r_2$ | $r_3$ | $r_4$ | $r_5$ | $r_6$ | $r_7$ | $r_8$ |
| $q=0$ | | — | — | P | — | P | — | P | — | P |
| INPUT INSTRUCTION | $q=1$ | F2C(p, 1, 1) | N | 0 | N | 0 | N | 1 | N | 1 |
| | $q=2$ | F2C(p, 2, 1) | N | 0 | N | 1 | N | 0 | N | 1 |
| | $q=3$ | F2C(p, 3, 1) | N | 1 | N | 1 | N | 1 | N | 1 |

FIG.25

| TLIPP(1, 1, 0) | NUMBER OF SEGMENTS divT(1, 1) OF FUNCTION FOR COMBINATION I_na(1) O_na(1) |
|---|---|
| TLIPP(1, 1, 1) | REGISTRATION INFORMATION OF PROGRAM COMPONENT FOR T2(1, 1, 1) |
| TLIPP(1, 1, 2) | REGISTRATION INFORMATION OF PROGRAM COMPONENT FOR T2(1, 1, 2) |
| ... | ... |
| TLIPP(1, 1, divT(1, 1)+1) | REGISTRATION INFORMATION OF PROGRAM COMPONENT FOR T2(1, 1, divT(1, 1)+1) |
| TLIPP(2, 1, 0) | NUMBER OF SEGMENTS divT(2, 1) OF FUNCTION FOR COMBINATION I_na(2) O_na(1) |
| ... | ... |
| TLIPP(u, v, w) (u=1, ···, N:v=1, ···, M) | REGISTRATION INFORMATION OF PROGRAM COMPONENT FOR I≠0:T2(u, v, w) NUMBER OF SEGMENTS divT(u, v) OF FUNCTION FOR COMBINATION I≠0:I_na(u) O_na(v) |
| ... | ... |

FIG.26

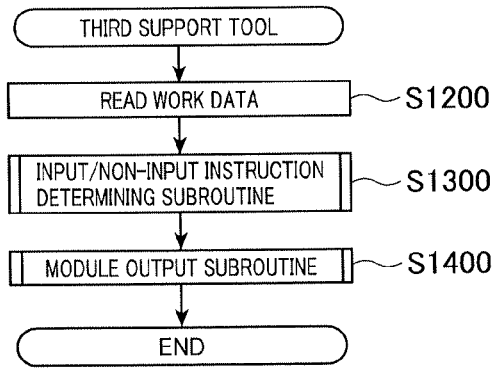

METHOD OF GENERATING INTERMEDIATE MODULE BETWEEN HIGHER-LEVEL MODULE AND LOWER LEVEL MODULE

CROSS REFERENCE TO RELATED APPLICATIONS

This application is based on Japanese Patent Application 2010-066713 filed on Mar. 23, 2010. This application claims the benefit of priority from the Japanese Patent Application, so that the descriptions of which are all incorporated herein by reference.

TECHNICAL FIELD

The present disclosure relates to methods of generating modules in a plurality of modules that are ordered from high to low and are to be implemented in electronic devices; these generated modules are intermediate modules. Each of the intermediate modules has functions of: generating, for respective instructions inputted from a higher-level module, instructions for a corresponding lower-level module; and outputting the generated instructions to the corresponding lower-level module as output instructions. The present disclosure also relates to devices for supporting the generation of these intermediate modules.

BACKGROUND

Software development uses a plurality of categorized libraries each including high versatile programs of a corresponding category, as an example of which is disclosed in Japanese Patent Application Publication No. 2007-226793.

Software development also uses, in order to reduce the size of an encoded program for running similar statements, the following approach that encodes these similar statements as a program code to avoid duplicated program codes; this program code includes a set of successive statements including jump statements.

Software is recently designed in modules for improvement of the efficiency of its development; each of these modules includes a set of program codes for implementing a set of functions to be required. This approach can be used for the development of software for electronic control units (ECUS) to be implemented in vehicles.

It appears that the standardization of modules of software with high development costs, such as software to be installed in vehicles, is being considered; these standardized modules can be used by the same manufacturer or the different manufactures in the same industry.

SUMMARY

The inventor has discovered that there are points that should be improved in the aforementioned standardization of modules of software. Specifically, software can be used in various environments. Thus, standardization of modules of software to be used in various environments results in that a set of program codes for implementing a set of functions to be required in the various environments is installed in each of the standardized modules. This may increase the size of each of the standardized modules (the size of the set of program codes of each of the standardized modules).

In other words, because a standardized module to be used in a specified environment includes some program codes whose corresponding functions are not worked in the specified environment, installation, into an electronic device used for another environment, of the standardized module requires, in the electronic device, a large-sized space in which the standardized module is to be implemented. If a standardized module to be used in a specified environment includes a large number of program codes whose corresponding functions were not worked in the specified environment, it would be difficult to install, into an electronic device used for another environment, the standardized module because a sufficient space required for the standardized module to be implemented could not be ensured.

Note that these problems set forth above may be caused for standardization of modules of hardware circuits. Specifically, standardization of modules of a hardware circuit to be used in various environments results in that a set of circuit components for implementing a set of functions to be required in the various environments is installed in each of the standardized modules. This may increase the size of each of the standardized modules (the size of the set of circuit components of each of the standardized modules).

In view of the circumstances set forth above, an aspect of the present disclosure seeks to provide new approaches designed to address the points that should be improved in the aforementioned standardization of modules of software and/or hardware circuits.

Specifically, an alternative aspect of the present disclosure aims to provide new approaches capable of efficiently generating modules of software and/or hardware circuits with their sizes being limited; these modules are used in various environments, more specifically, in various devices.

According to one aspect of the present disclosure, there is provided a method of generating an intermediate module, which comprises a plurality of structural components, in a plurality of modules to be installed in an electronic device. The plurality of modules include a higher-level module higher in level than the intermediate module, and a lower-level module lower in level than the intermediate module. The intermediate module has at least one function and is designed to generate, for a plurality of input instructions inputtable thereto, a plurality of output instructions, respectively, for the lower-level module, and pass, to the lower-level module, the plurality of output instructions. The method includes dividing the at least one function into a plurality of segmented functions each of which matches a corresponding one of combinations of one of the plurality of input instructions and one of the plurality of output instructions. The method includes specifying at least one "commonalized" (made in common, sometimes referred to herein as "commonized") group of segmented functions in a part of the plurality of segmented functions, the part of the plurality of segmented functions being response to a common one of the plurality of output instructions. The specified segmented functions in the at least one commonalized group to make common at least one of the structural components of the intermediate module. The method includes classifying the plurality of input instructions as at least one select input instruction and at least one basic input instruction. The at least one select input instruction is designed such that whether the at least one select input instruction is inputted or non-inputted to the intermediate module depends on a type of the higher-level module. The at least one basic input instruction is designed to be inputted to the intermediate module independently of the type of the higher-level module. The method includes eliminating at least one combination of segmented functions in all of the segmented functions in the at least one commonalized group specified by the specifying, the at least one combination of the segmented functions corresponding to at least one combination of only the at least one select input instruction non-inputted to the intermediate module. The method includes generating at least one combination component as one of the plurality of structural components of the intermediate module, the at least one combination component being shared by a corresponding combination of the remaining segmented functions in the at least one commonalized group after the elimination. The method includes generating at least one single component as one of the plurality of structural components of the intermediate module, the at least one single component implementing at least one segmented function in the plurality of segmented functions, the at least one segmented function being unclassified into the at least one commonalized group. The method includes generating the intermediate module by linking the at least one combination component and the at least one single component with each other.

According to another aspect of the present disclosure, there is provided a device for supporting a user to generate an intermediate module in a plurality of modules to be installed in an electronic device. The plurality of modules include a higher-level module higher in level than the intermediate module, and a lower-level module lower in level than the intermediate module. The intermediate module is designed to generate, for a plurality of input instructions inputtable thereto, a plurality of output instructions, respectively, for the lower-level module, and pass, to the lower-level module, the plurality of output instructions. The device includes a user-operable input interface, an output interface, and an instruction information obtainer configured to obtain, via the user-operable input interface, first information representing a group of the plurality of input instructions and a group of the plurality of output instructions. The device includes a select-input information obtainer configured to obtain, via the user-operable input interface, second information representing at least one select input instruction in the plurality of input instructions represented by the first information. The at least one select input instruction is designed such that whether the at least one select input instruction is inputted or non-inputted to the intermediate module depends on a type of the higher-level module. The device includes an information provider configured to generate, based on the second information obtained by the select-input information obtainer, third information representing a plurality of patterns of combinations of the plurality of input instructions according to whether the at least one select input instruction is to be inputted or non-inputted to the intermediate module, and to provide, through the output interface, the third information as user-recognizable first image information.

According to a further aspect of the present disclosure, there is provided a computer program product including a computer usable medium; and a set of computer program instructions embodied on the computer useable medium. The instructions include a first instruction that causes a computer of a support device including a user-operable input interface and an output interface to obtain, via the user-operable input interface, first information representing a group of the plurality of input instructions and a group of the plurality of output instructions. The instructions include a second instruction that causes the computer to obtain, via the user-operable input interface, second information representing at least one select input instruction in the plurality of input instructions represented by the first information. The at least one select input instruction is designed such that whether the at least one select input instruction is inputted or non-inputted to the intermediate module depends on a type of the higher-level module. The instructions include a third instruction that causes the computer to generate, based on the second information, third information representing a plurality of patterns of combinations of the plurality of input instructions according to whether the at least one select input instruction is to be inputted or non-inputted to the intermediate module, and to provide, through the output interface, the third information as user-recognizable image information.

The above and/or other features, and/or advantages of various aspects of the present disclosure will be further appreciated in view of the following description in conjunction with the accompanying drawings. Various aspects of the present disclosure can include and/or exclude different features, and/or advantages where applicable. In addition, various aspects of the present disclosure can combine one or more feature of other embodiments where applicable. The descriptions of features, and/or advantages of particular embodiments should not be constructed as limiting other embodiments or the claims.

BRIEF DESCRIPTION OF THE DRAWINGS

Other aspects of the present disclosure will become apparent from the following description of embodiments with reference to the accompanying drawings in which.

Figure 3:
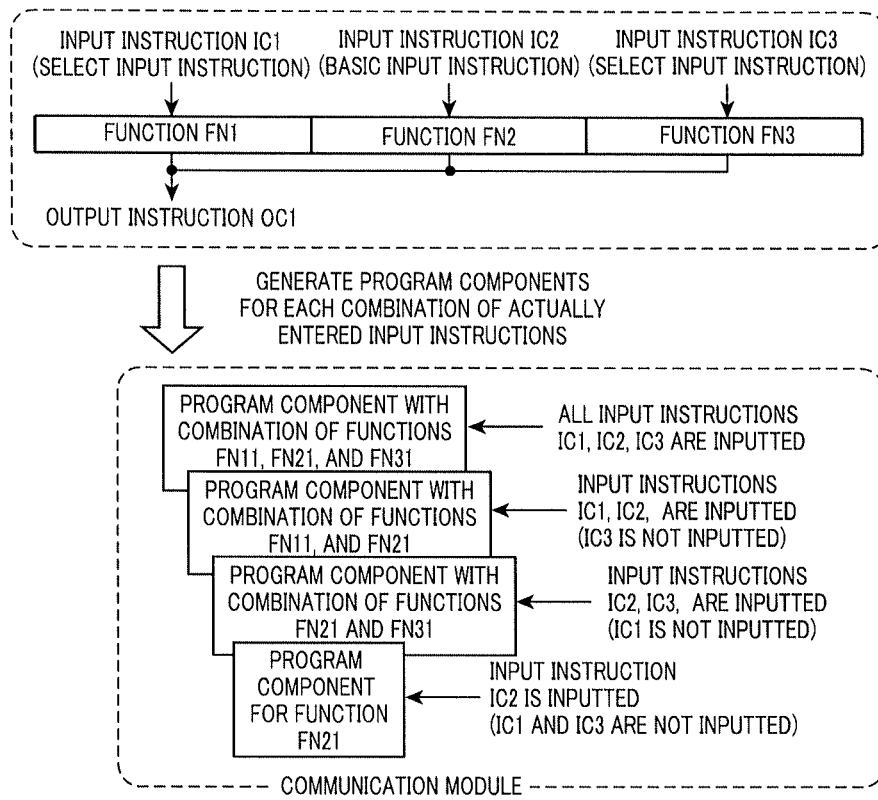
Figure 4:
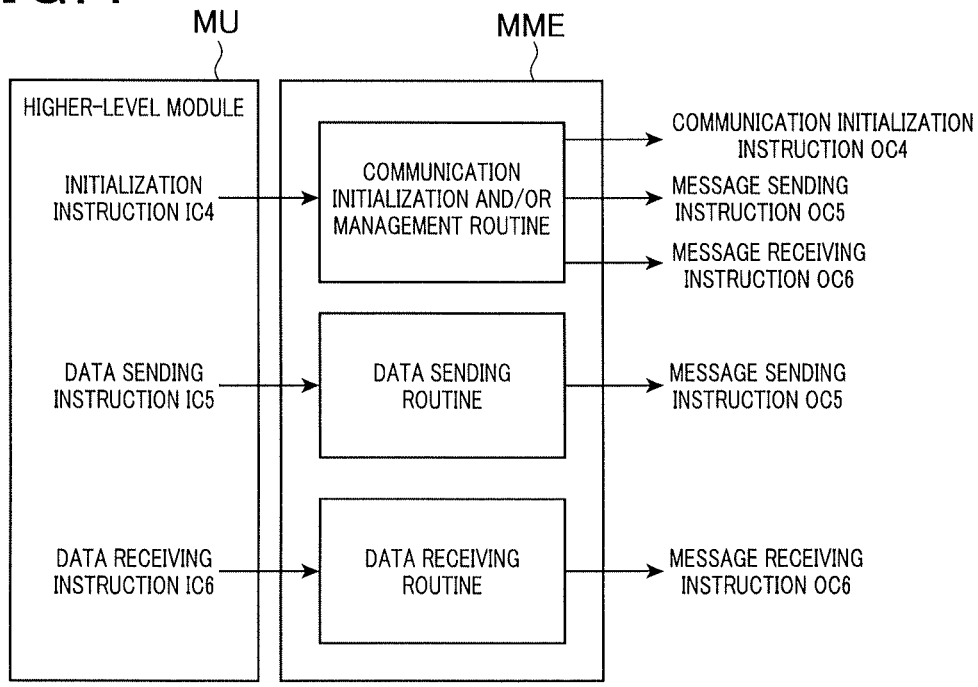
Figure 5:
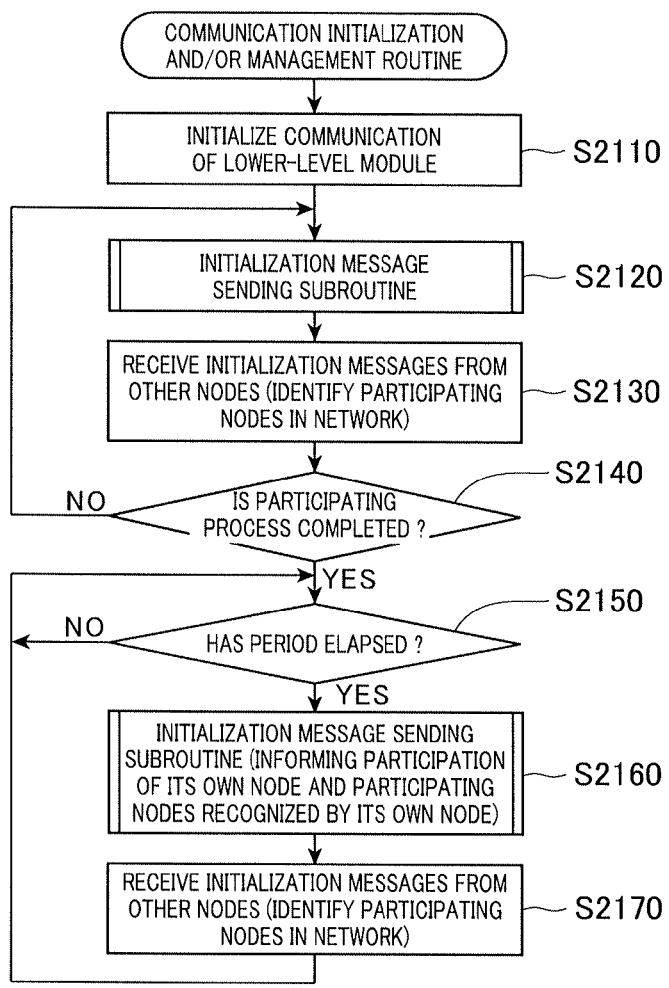
Figure 6:
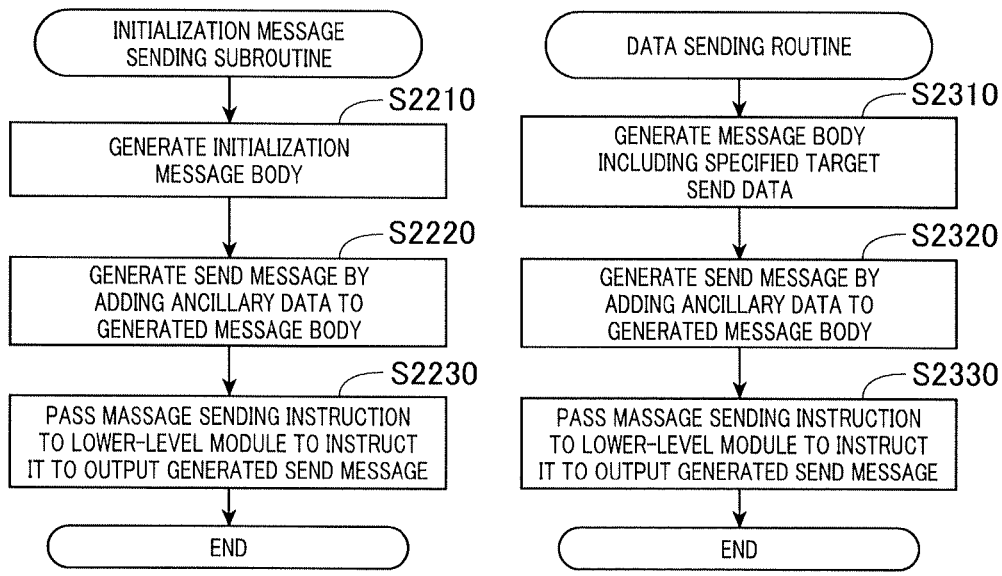
Figure 7:
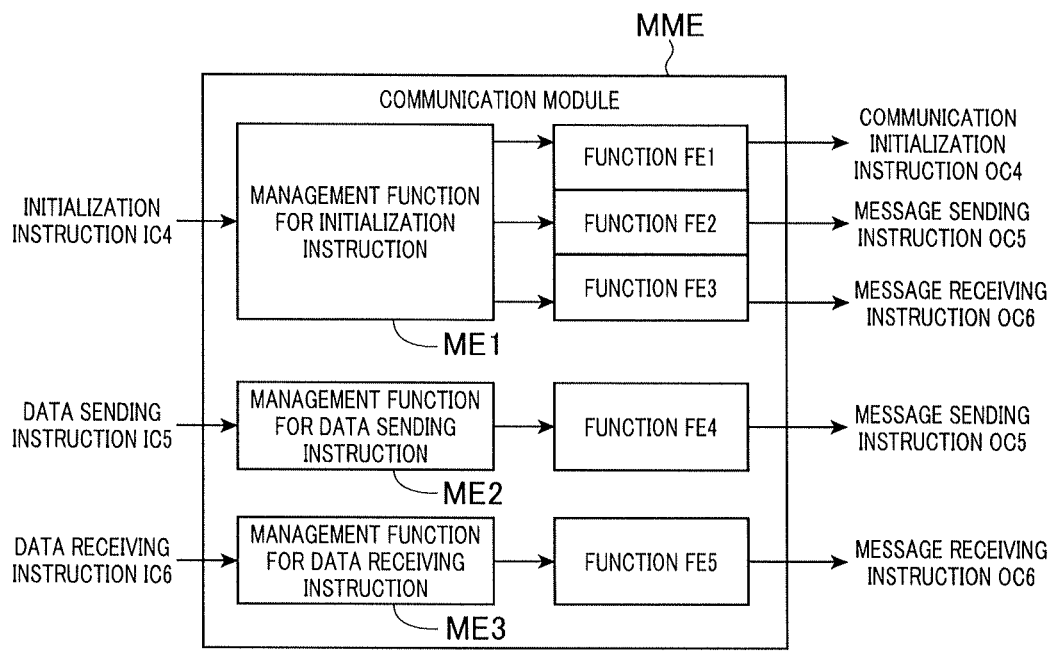
Figure 8:
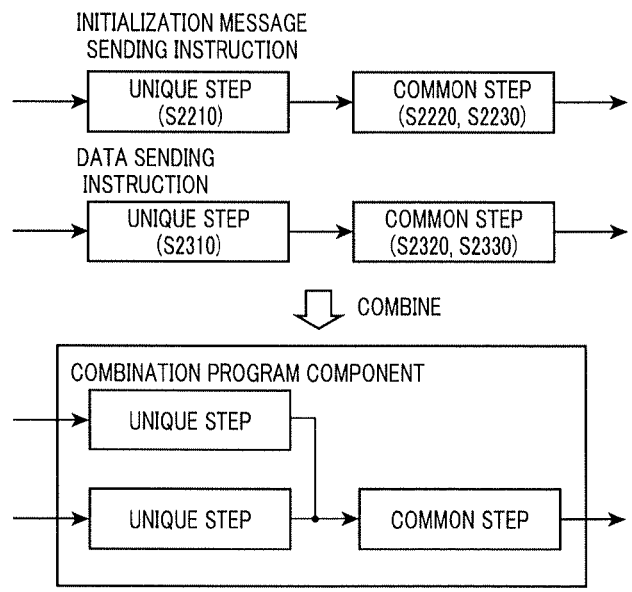
Figure 9:
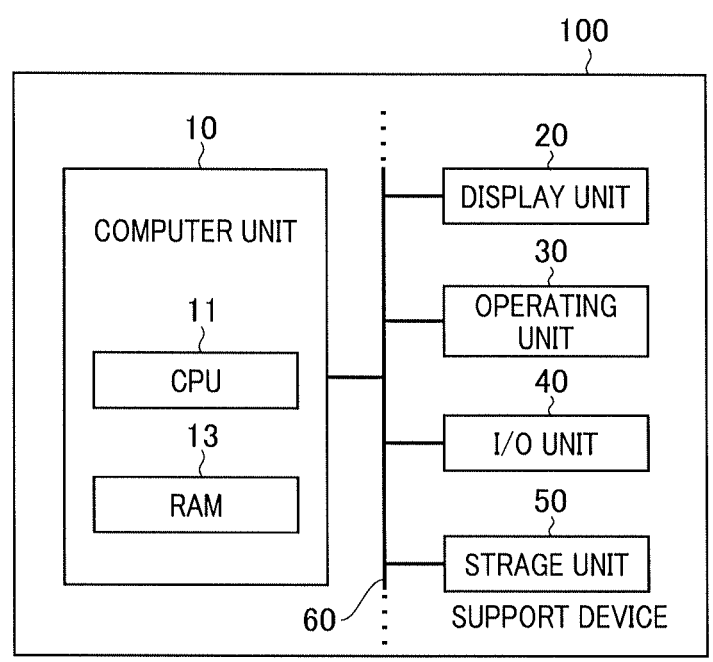
Figure 10:
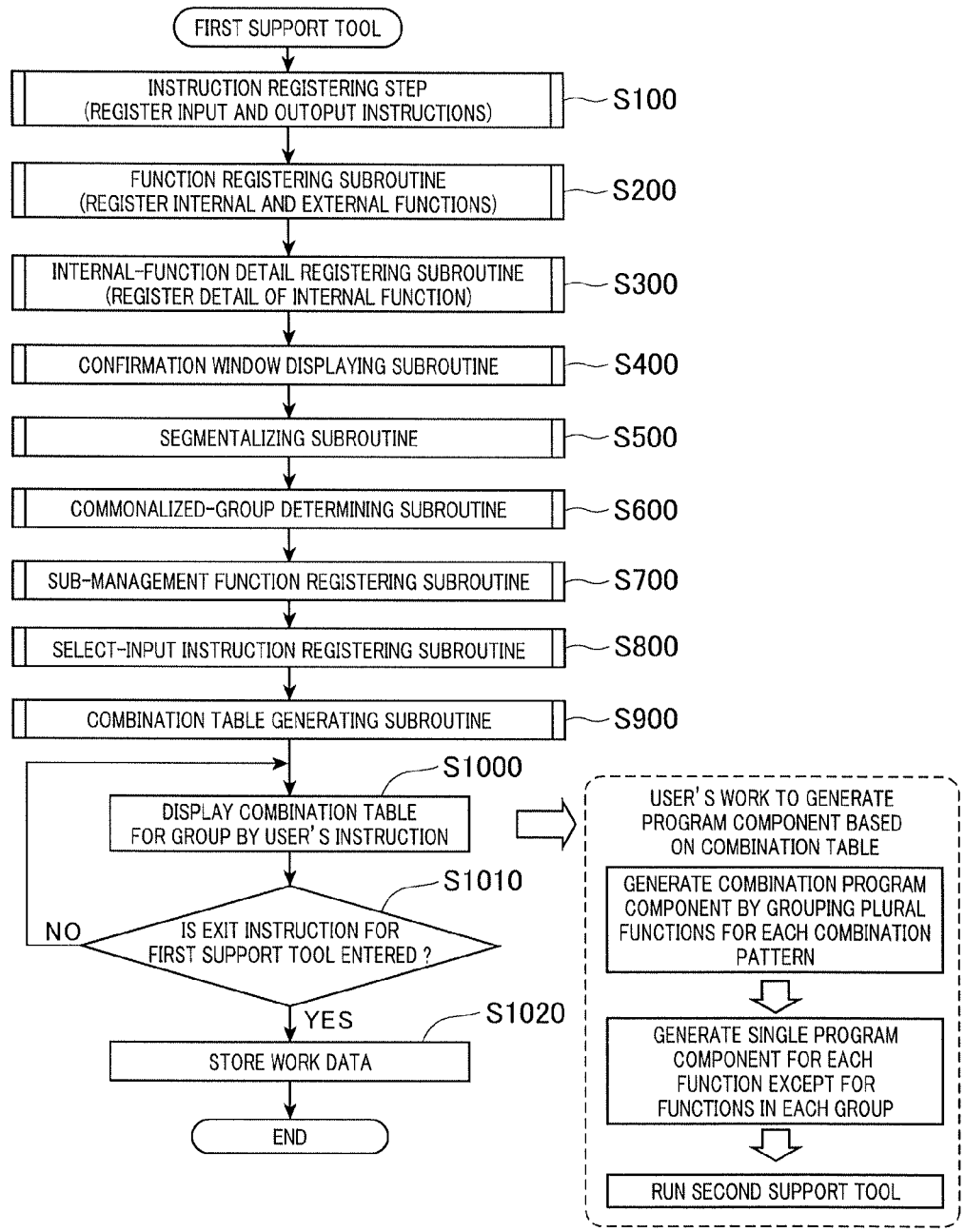
Figure 11:
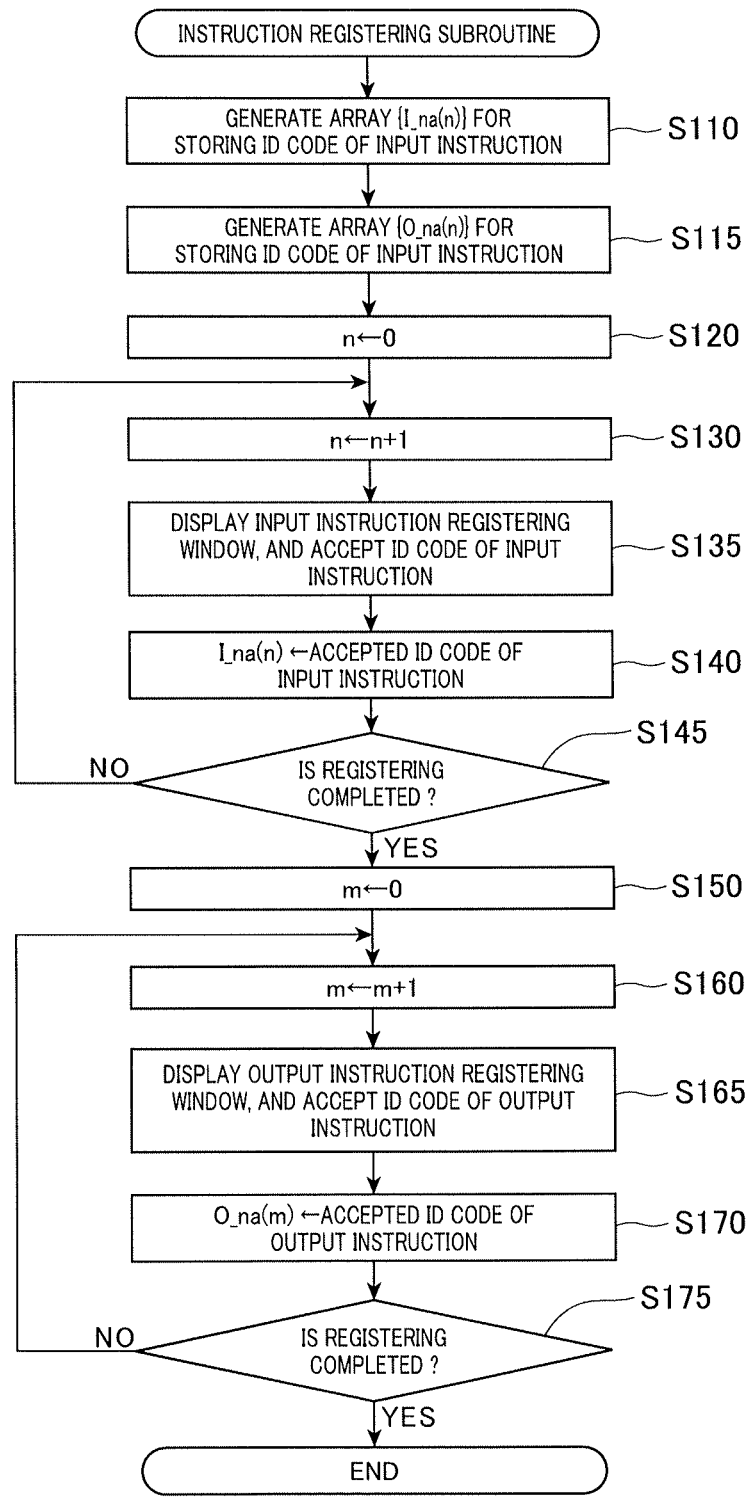
Figure 12:
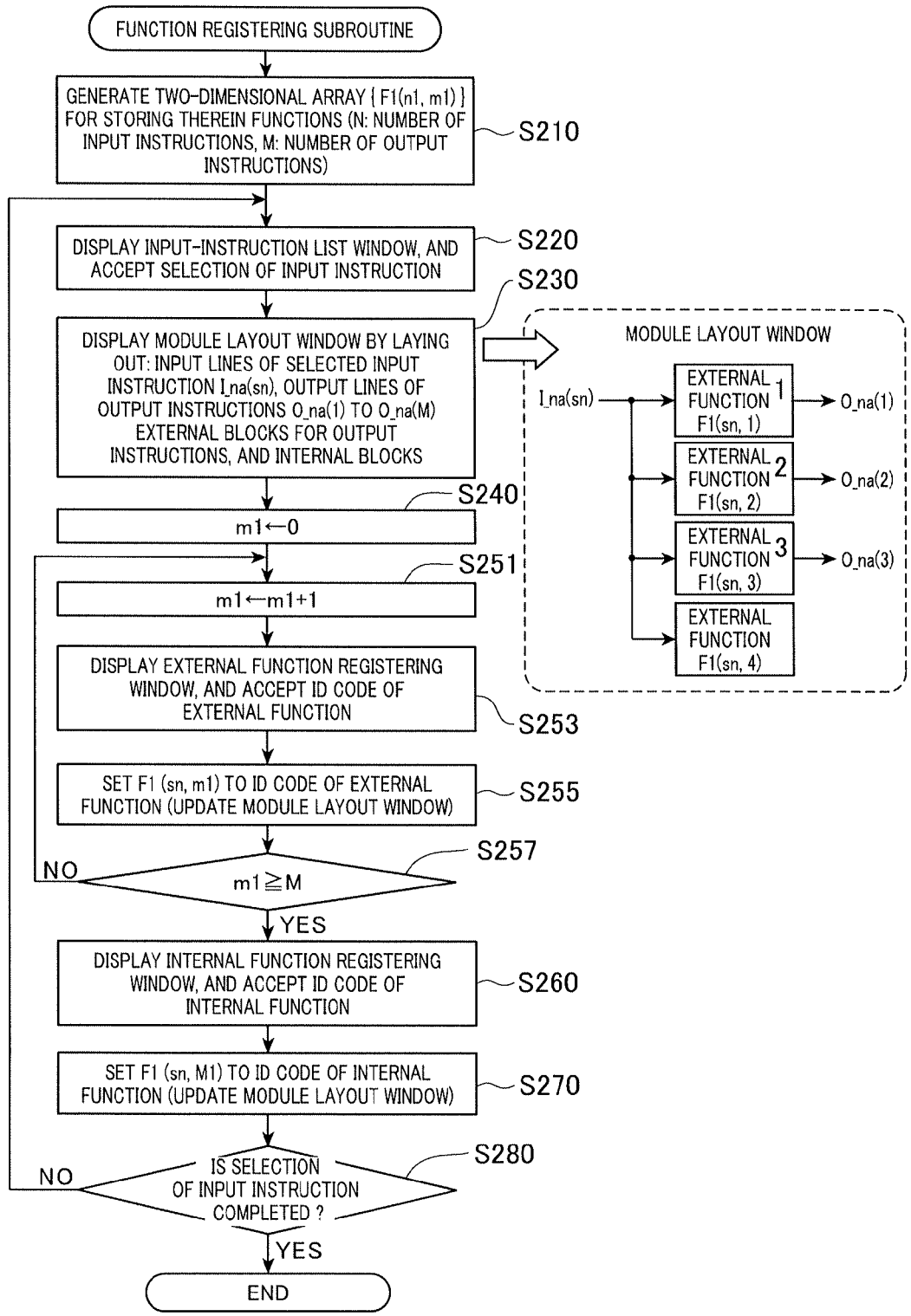
Figure 13:
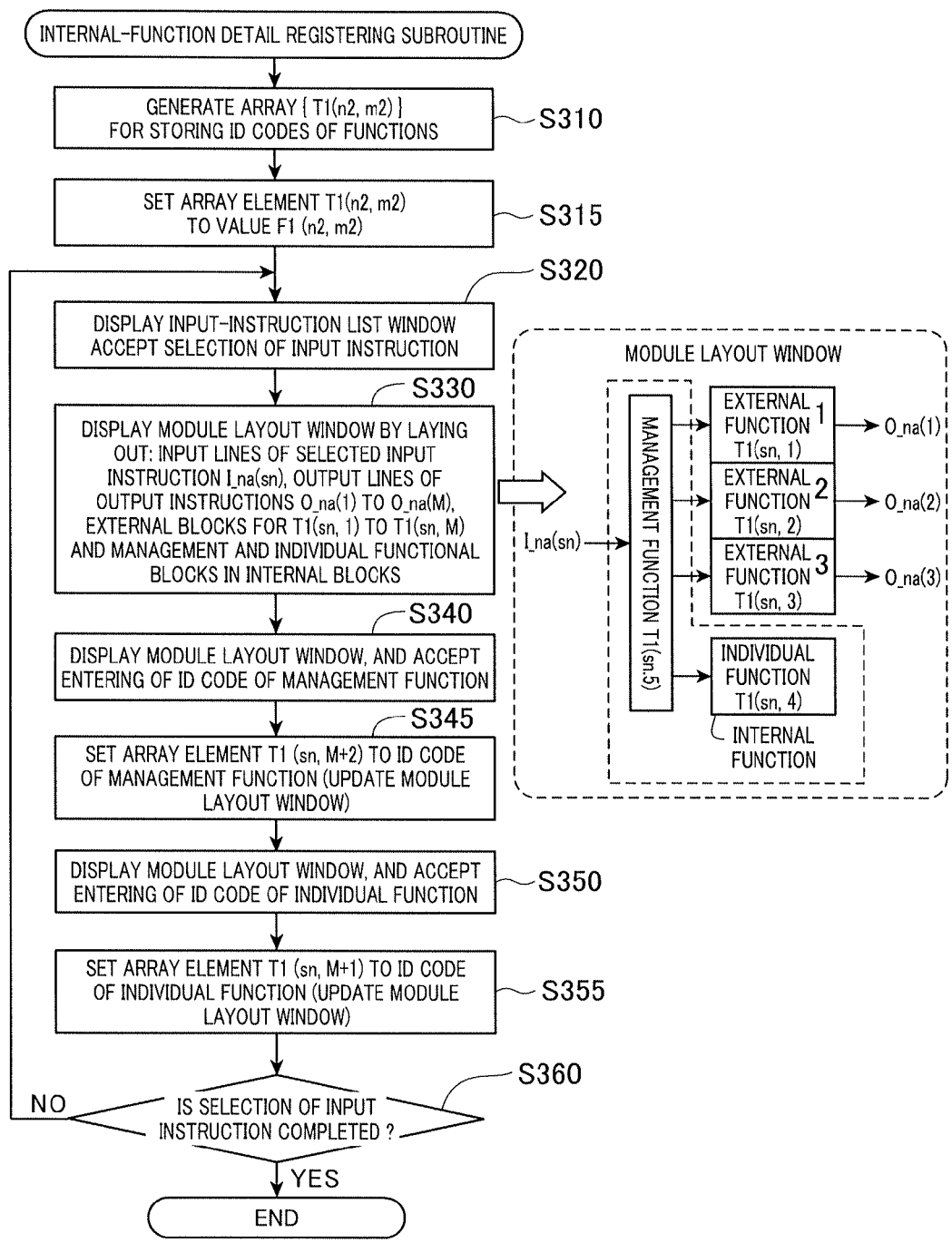
Figure 14:
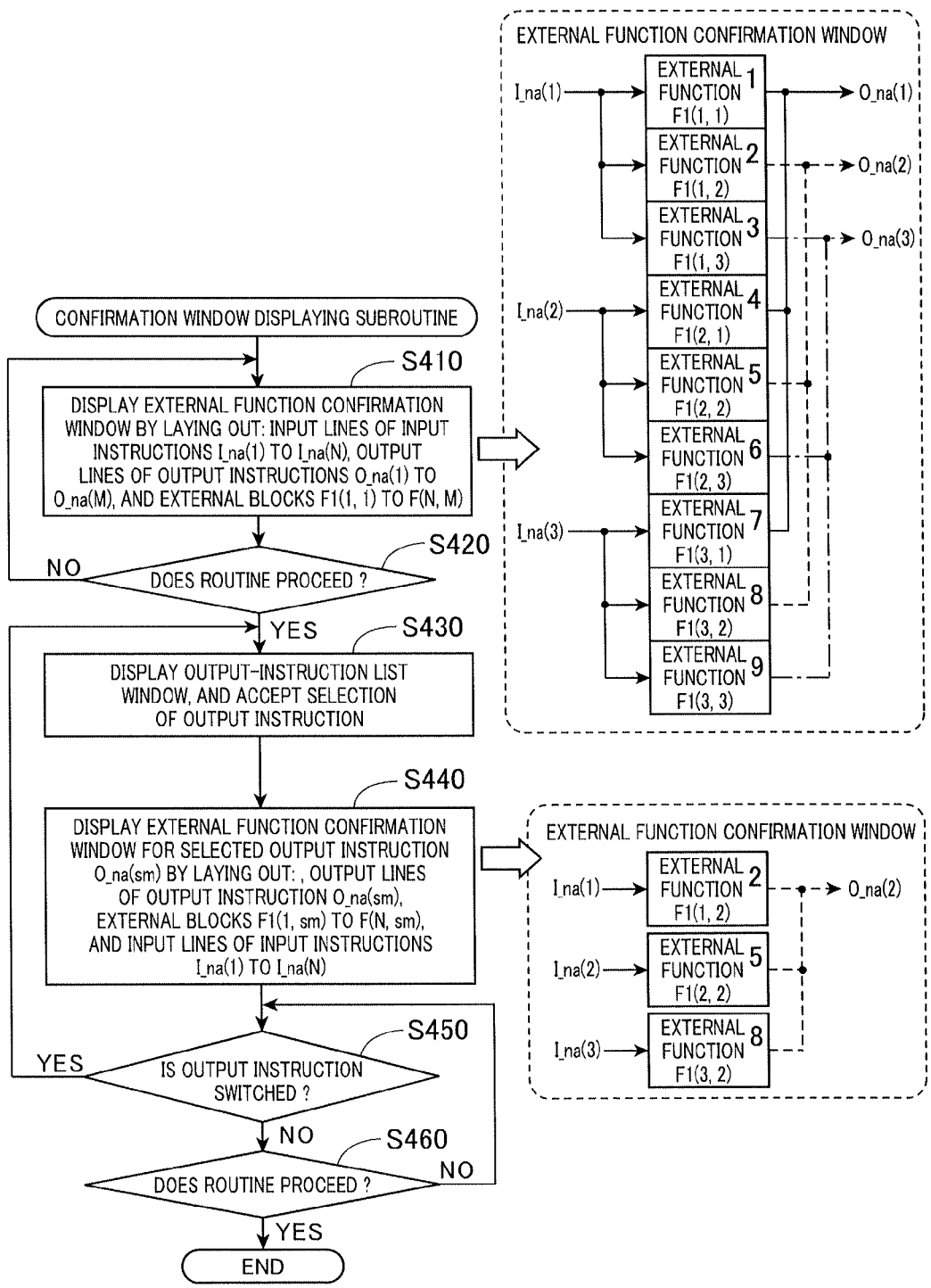
Figure 15:
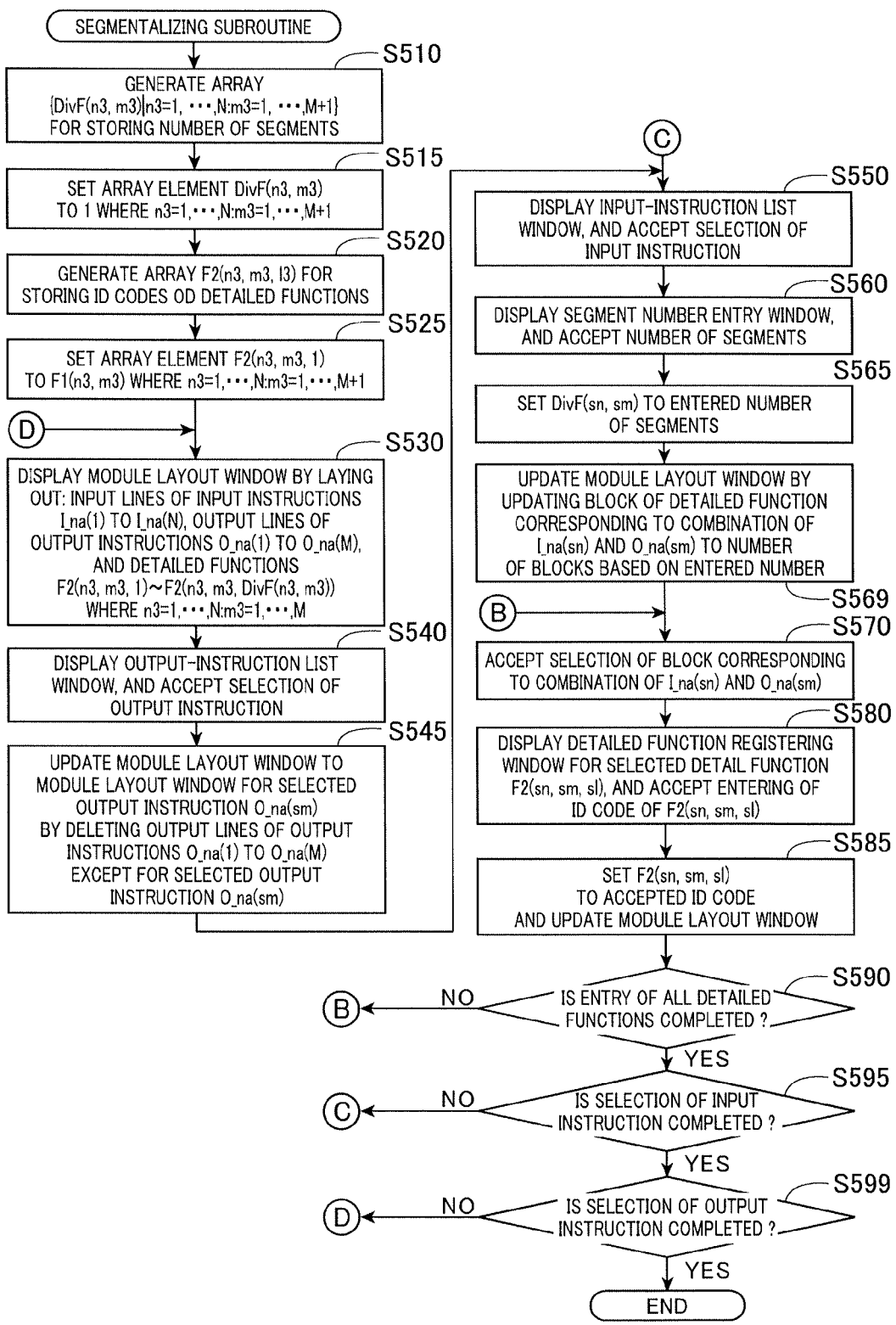
Figure 16:
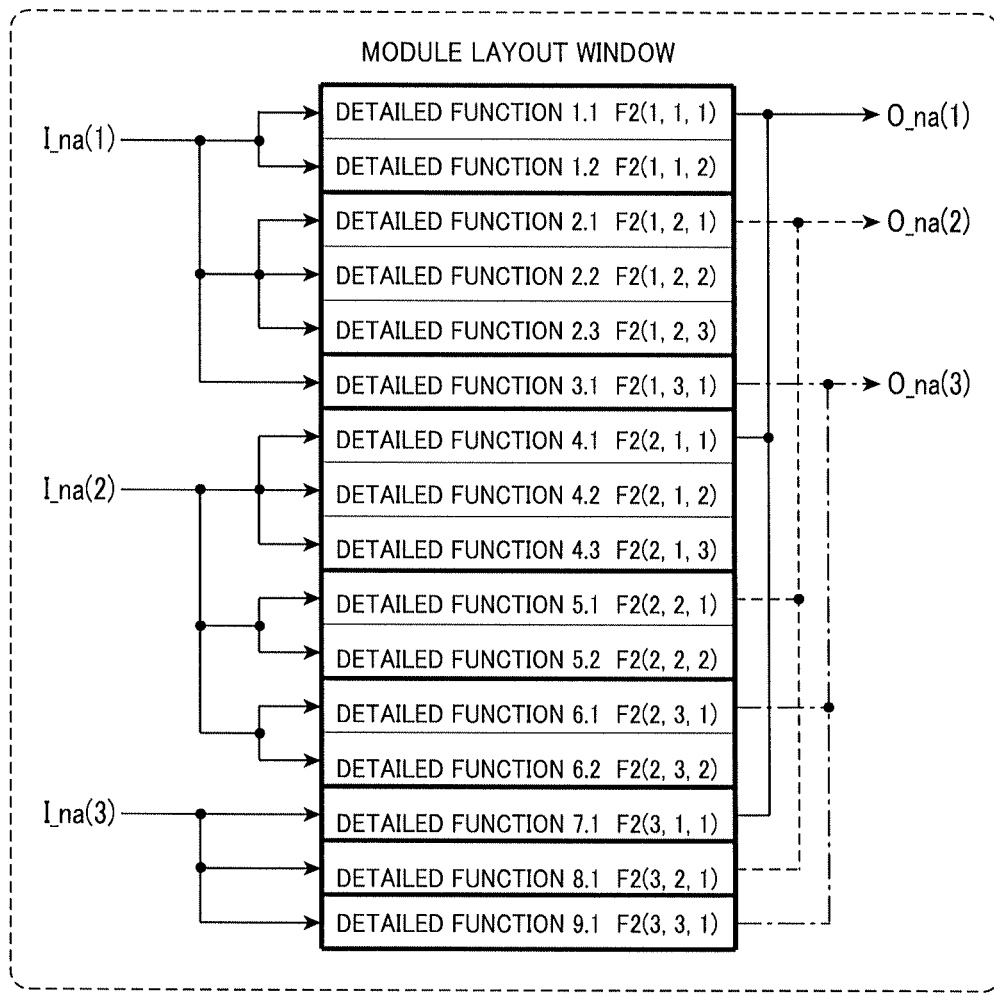
Figure 17:
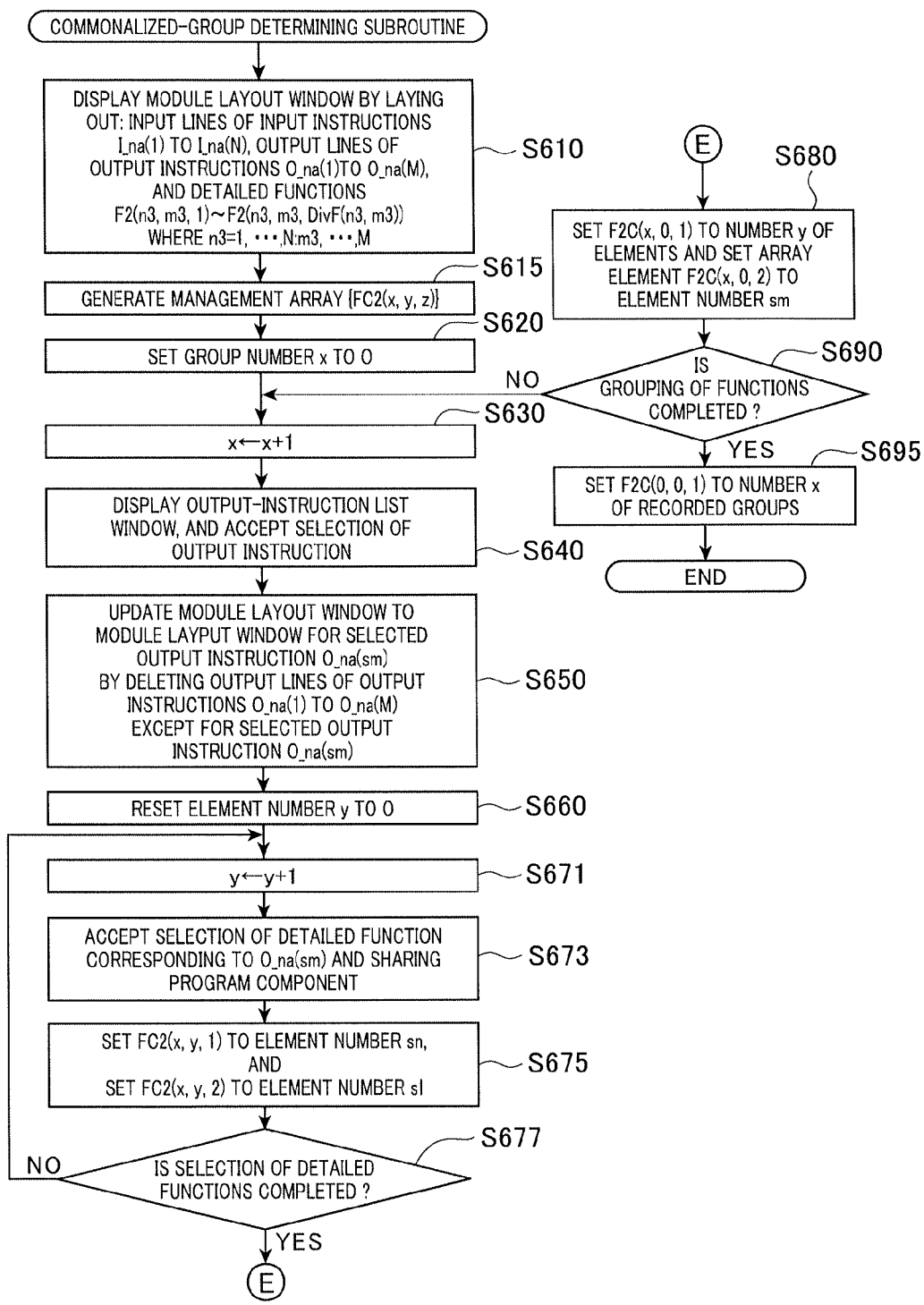
Figure 18:
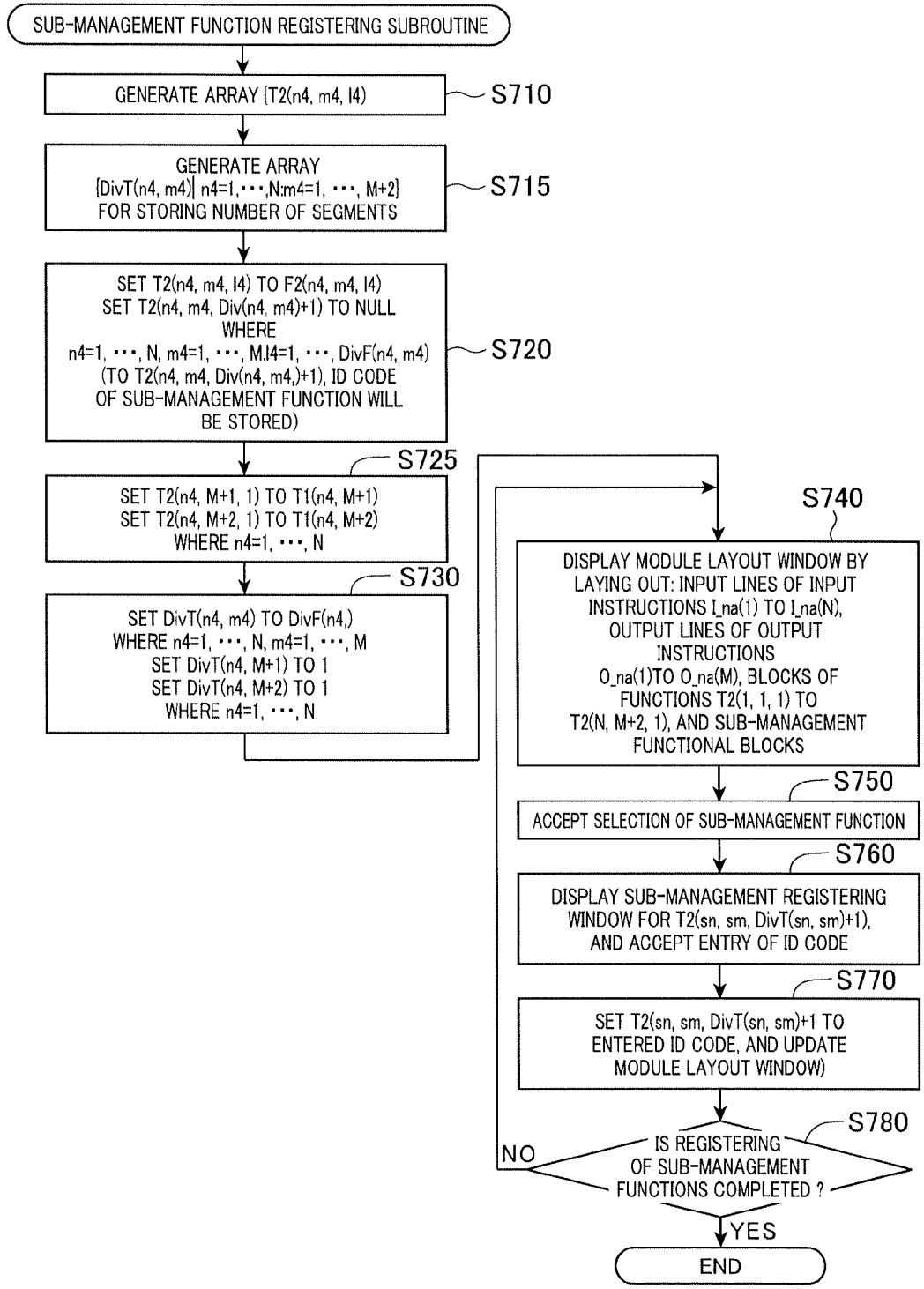
Figure 19:
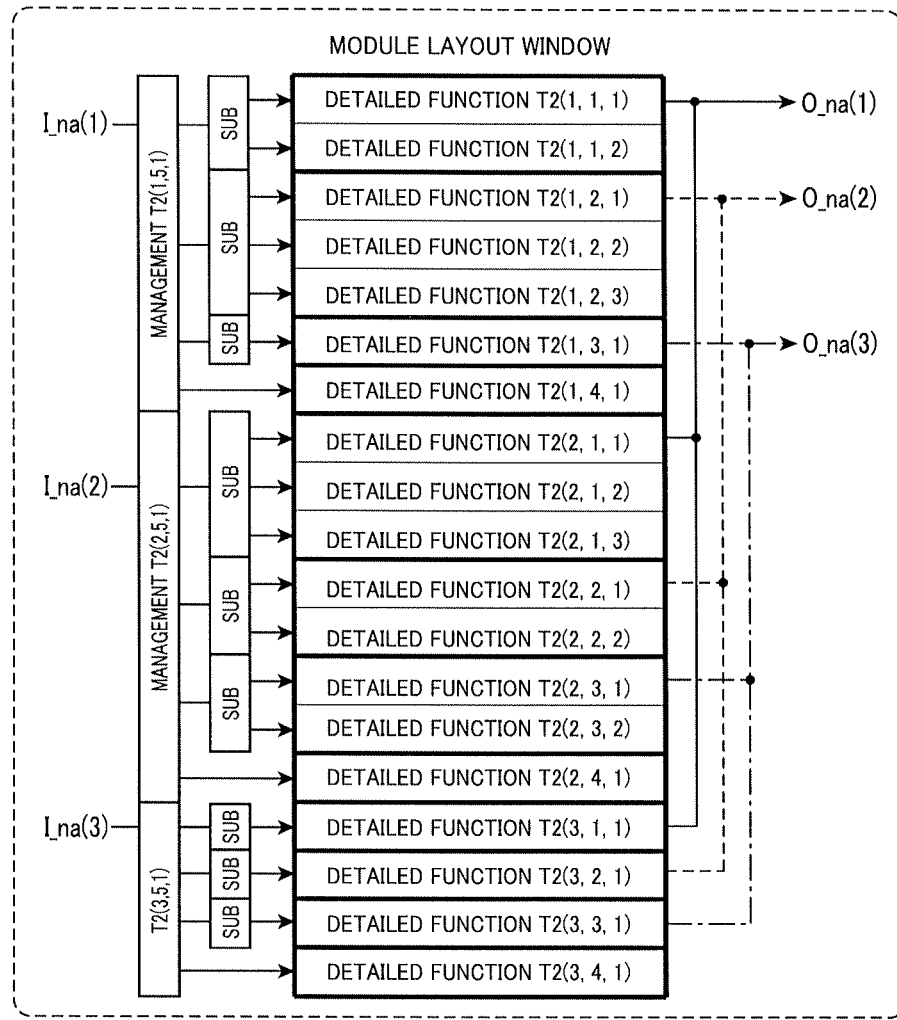
Figure 20:
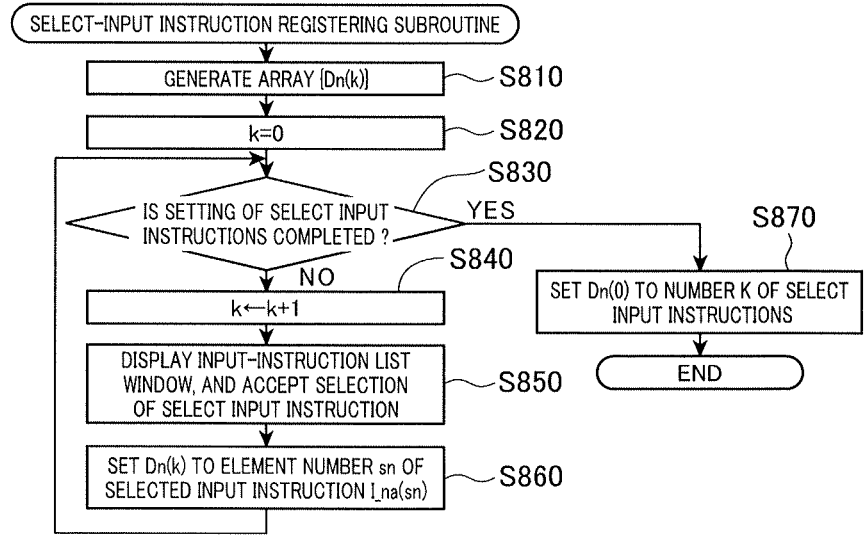
Figure 21:
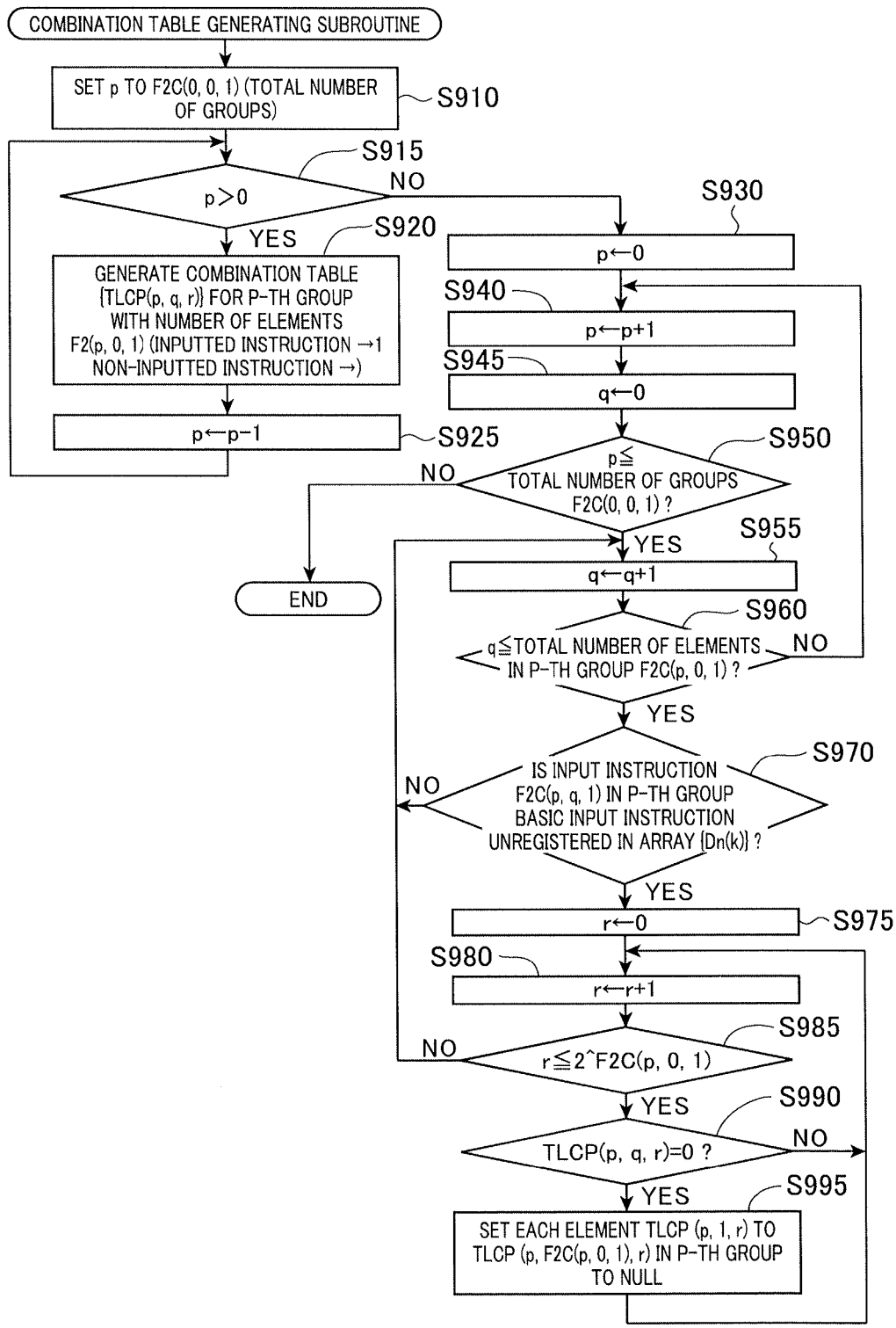
Figure 23:
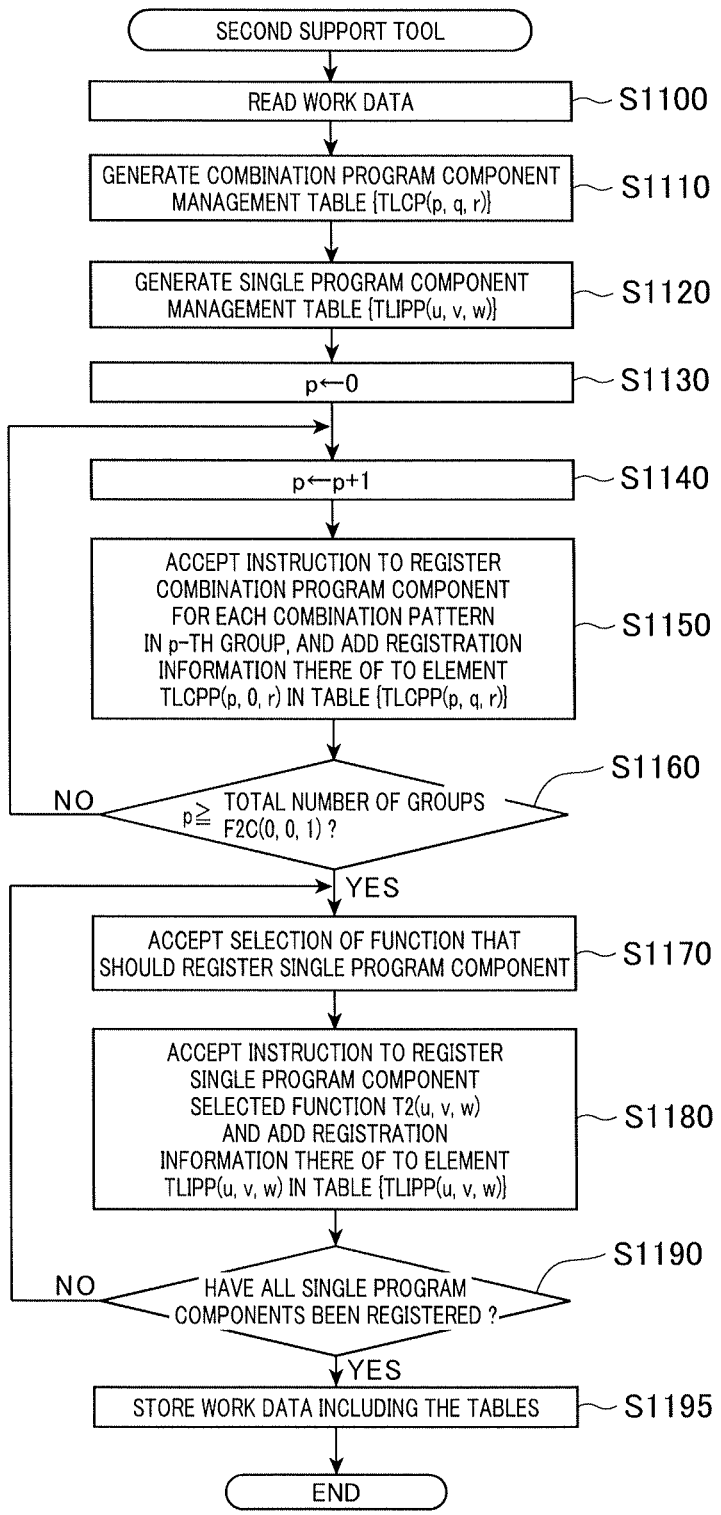
Figure 27:
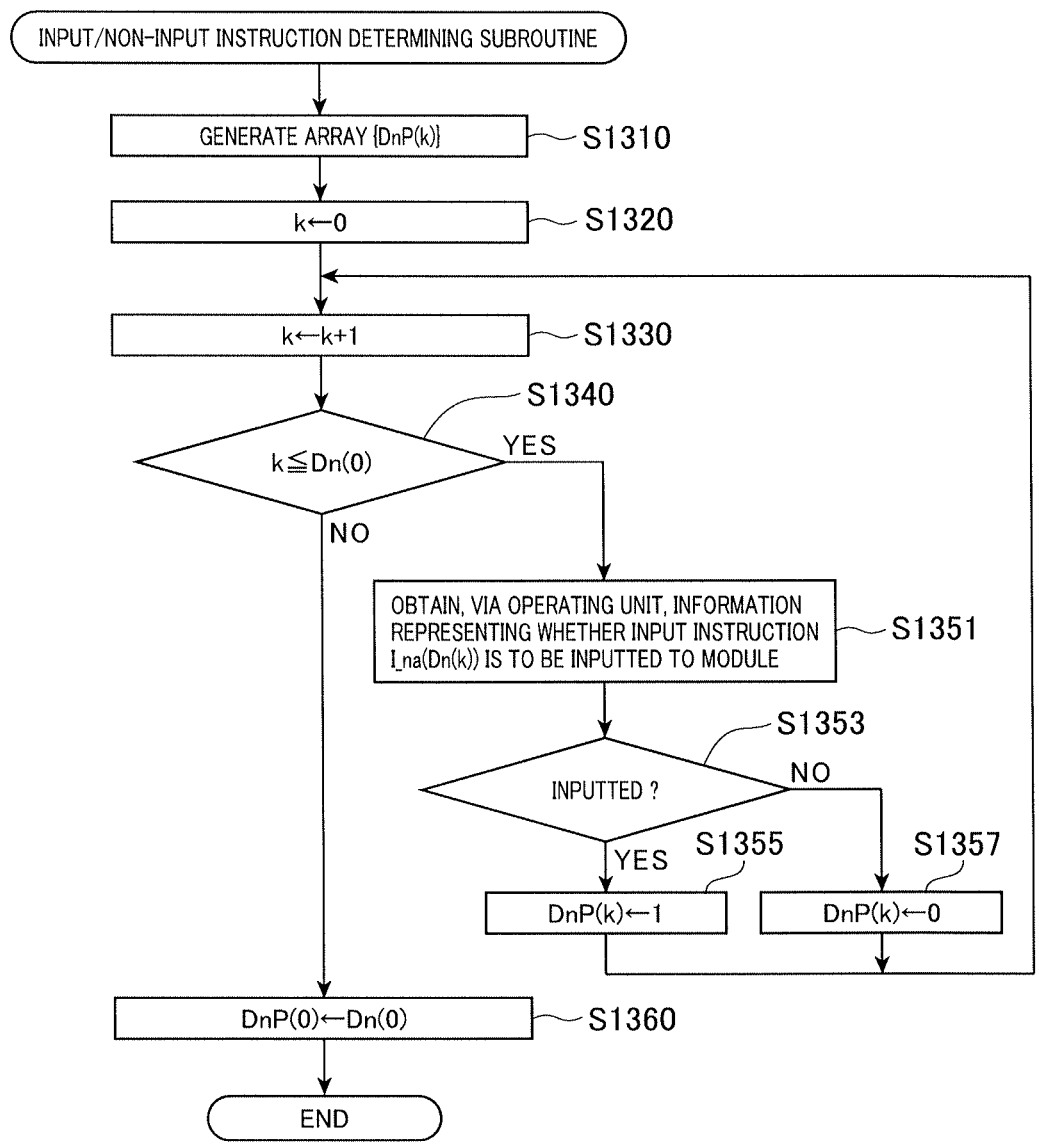
Figure 28:
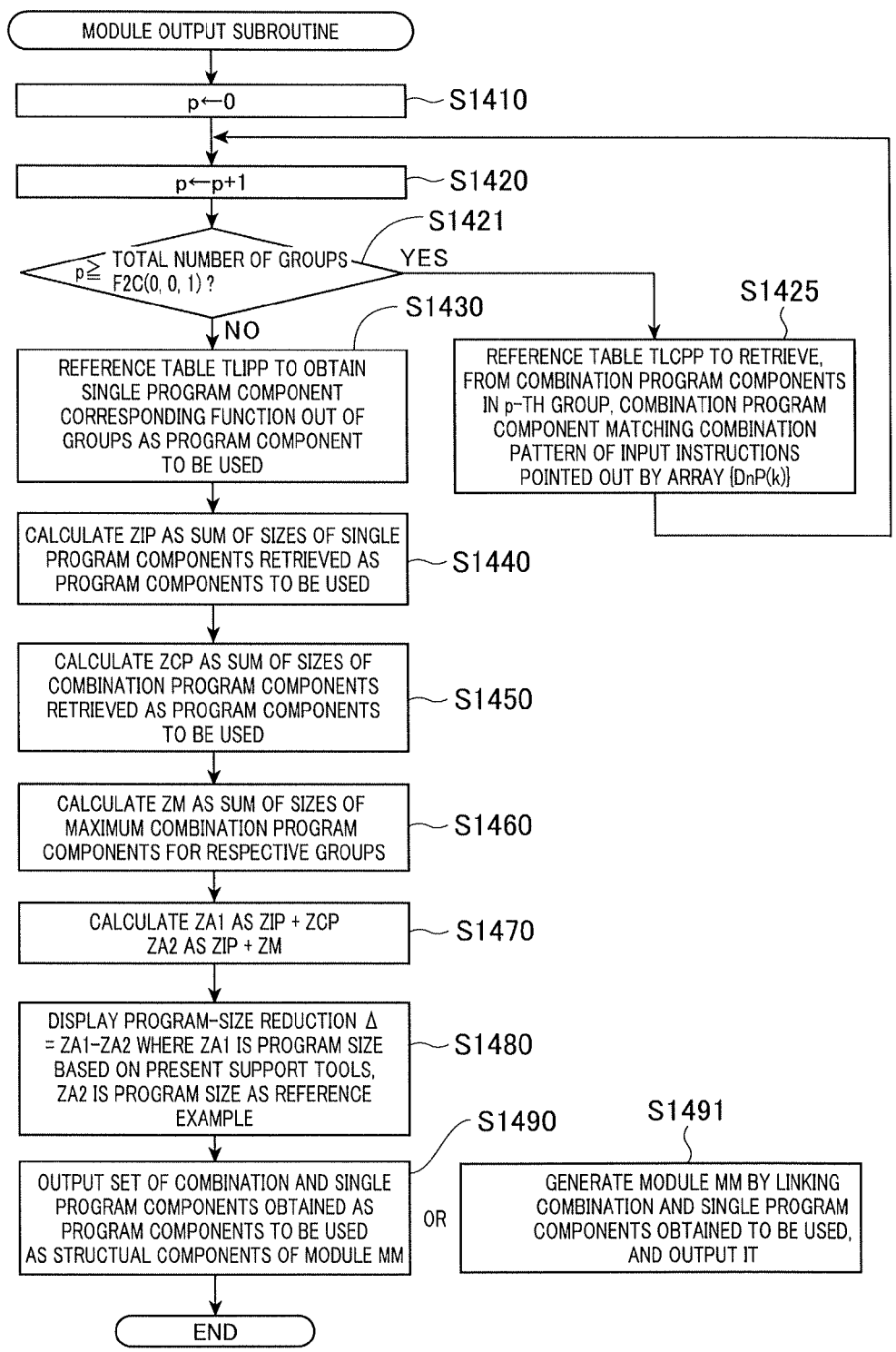
Figure 29:
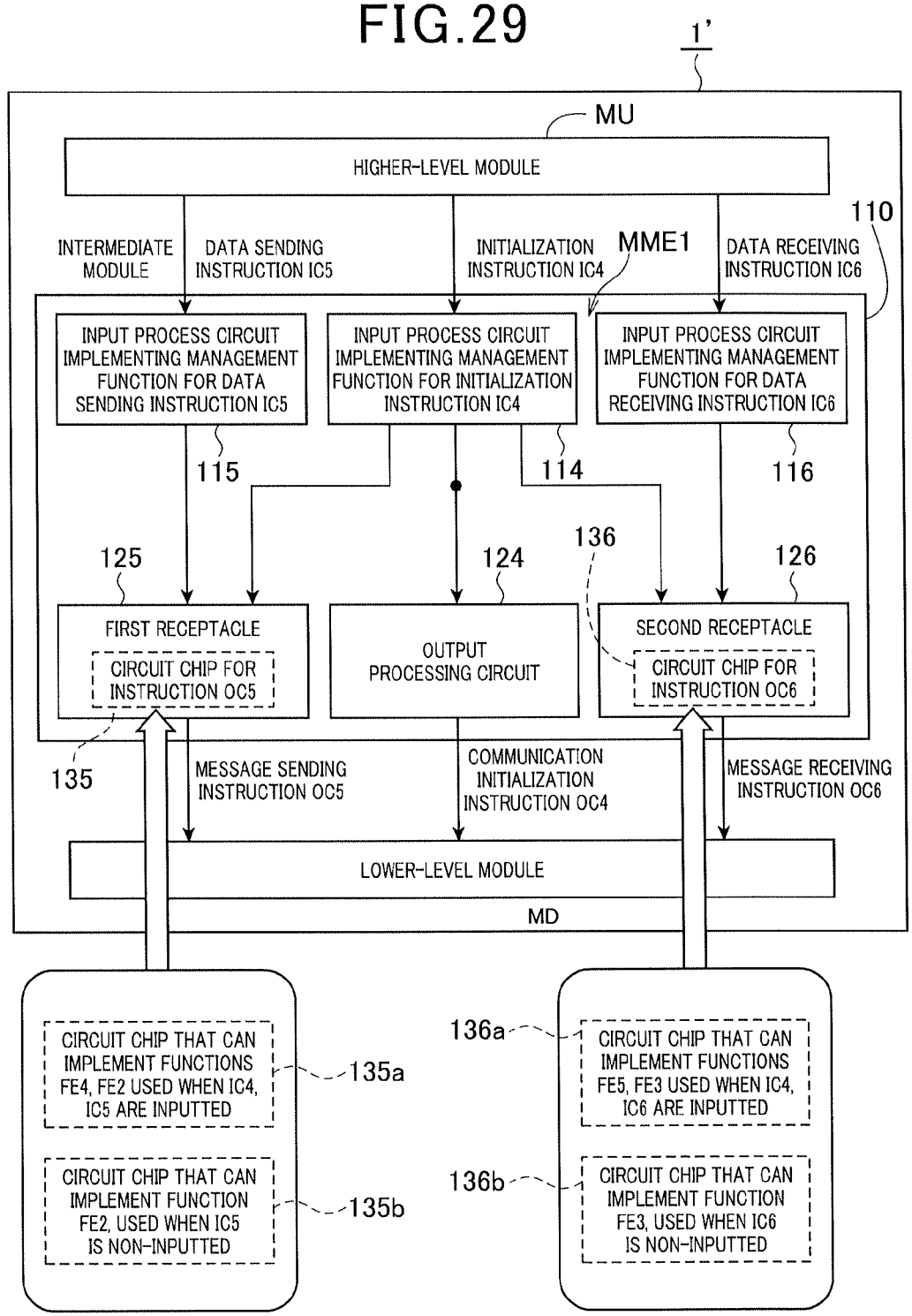

(a) of FIG. 2 is a flowchart schematically illustrating steps of a first stage of a method of generating the intermediate module according to the embodiment;

(b) of FIG. 2 is a flowchart schematically illustrating steps of a second stage of the method of generating the intermediate module according to the embodiment;

FIG. 3 is a view schematically illustrating a plurality of combination program components generated according to combinations of input instructions according to the embodiment;

FIG. 4 is a view schematically illustrating input/output instructions for a communication module as the intermediate module according to an example of the embodiment;

FIG. 5 is a flowchart schematically illustrating steps of a communication initialization and/or management routine of the communication module according to the example of the embodiment;

(a) of FIG. 6 is a flowchart schematically illustrating steps of an initialization message sending subroutine of the communication module according to the example of the embodiment;

(b) of FIG. 6 is a flowchart schematically illustrating steps of a data sending subroutine of the communication module according to the example of the embodiment;

FIG. 7 is a view schematically illustrating how to divide functions corresponding to the communication module according to the example of the embodiment;

FIG. 8 is a view schematically illustrating an example of the structure of a combination program component according to the example of the embodiment;

FIG. 9 is a block diagram schematically illustrating an example of the structure of a support device according to the embodiment;

FIG. 10 is a flowchart schematically illustrating steps of a first support tool to be executed by a CPU of the support device according to the embodiment;

FIG. 11 is a flowchart schematically illustrating an instruction registering subroutine in step S100 of the first support tool according to the embodiment;

FIG. 12 is a flowchart schematically illustrating a function registering subroutine in step S200 of the first support tool according to the embodiment;

FIG. 13 is a flowchart schematically illustrating an internal-function detail registering subroutine in step S300 of the first support tool according to the embodiment;

FIG. 14 is a flowchart schematically illustrating a confirmation window displaying subroutine in step S400 of the first support tool according to the embodiment;

FIG. 15 is a flowchart schematically illustrating a segmentalizing subroutine in step S500 of the first support tool according to the embodiment;

FIG. 16 is a view schematically illustrating a module layout window displayed on the screen of a display unit of the support device according to the embodiment;

FIG. 17 is a flowchart schematically illustrating a commonalized-group determining subroutine in step S600 of the first support tool according to the embodiment;

FIG. 18 is a flowchart schematically illustrating a sub-management function registering subroutine in step S700 of the first support tool according to the embodiment;

FIG. 19 is a view schematically illustrating a module layout window displayed on the screen of the display unit in step S740 of the sub-management function registering subroutine;

FIG. 20 is a flowchart schematically illustrating a select-input instruction registering subroutine in step S800 of the first support tool according to the embodiment;

FIG. 21 is a flowchart schematically illustrating a combination table generating subroutine in step S900 of the first support tool according to the embodiment;

FIG. 22 is a view schematically illustrating an example of the structure of a combination table according to the embodiment;

FIG. 23 is a flowchart schematically illustrating steps of a second tool to be executed by the CPU according to the embodiment;

FIG. 24 is a view schematically illustrating an example of the structure of a combination program-component management table according to the embodiment;

FIG. 25 is a view schematically illustrating an example of the structure of a single program-component management table according to the embodiment;

FIG. 26 is a flowchart schematically illustrating steps of a third tool to be executed by the CPU according to the embodiment;

FIG. 27 is a flowchart schematically illustrating an input/non-input instruction determining subroutine in step S1300 of the third support tool according to the embodiment;

FIG. 28 is a flowchart schematically illustrating a module output subroutine in step S1400 of the third support tool according to the embodiment; and FIG. 29 is a block diagram schematically illustrating an example of the structure of an electronic device according to a modification of the embodiment.

DETAILED DESCRIPTION OF EMBODIMENT

An embodiment of the present disclosure will be described hereinafter with reference to the accompanying drawings. In the drawings, identical reference characters are utilized to identify identical corresponding components.

This embodiment of the present disclosure is, as an example, applied to a method of generating a module MM in a plurality of modules, which are ordered from high to low and to be implemented in an electronic device 1. The generated module MM is an intermediate module having functions of: generating, for respective instructions IC1, IC2, and IC3 inputted from a higher-level module MU, instructions for a lower-level module MD; and outputting the generated instructions to the lower-level module MD as respective output instructions OC1, OC2, and OC3. That is, the intermediate module MM serves as an interface from the higher-level module MU to the lower-level module MD.

Note that the method of generating the intermediate module MM according to this embodiment will be described hereinafter as a method of generating a software (program) module as the intermediate module MM, but it can also be configured as a hardware module. Each of the higher-level module MU and the lower-level module MD can be configured as a software module or a hardware module independently of whether the intermediate module MM is designed as a software module or a hardware module.

In this embodiment, each of the plurality of modules to be installed in the electronic device 1 is a software module for simplification of the descriptions of the method of generating the intermediate module MM. A plurality of functions included in the electronic device 1 are implemented as operations of the plurality of modules, in other words, steps of a computer that runs the plurality of modules.

Figure 1:
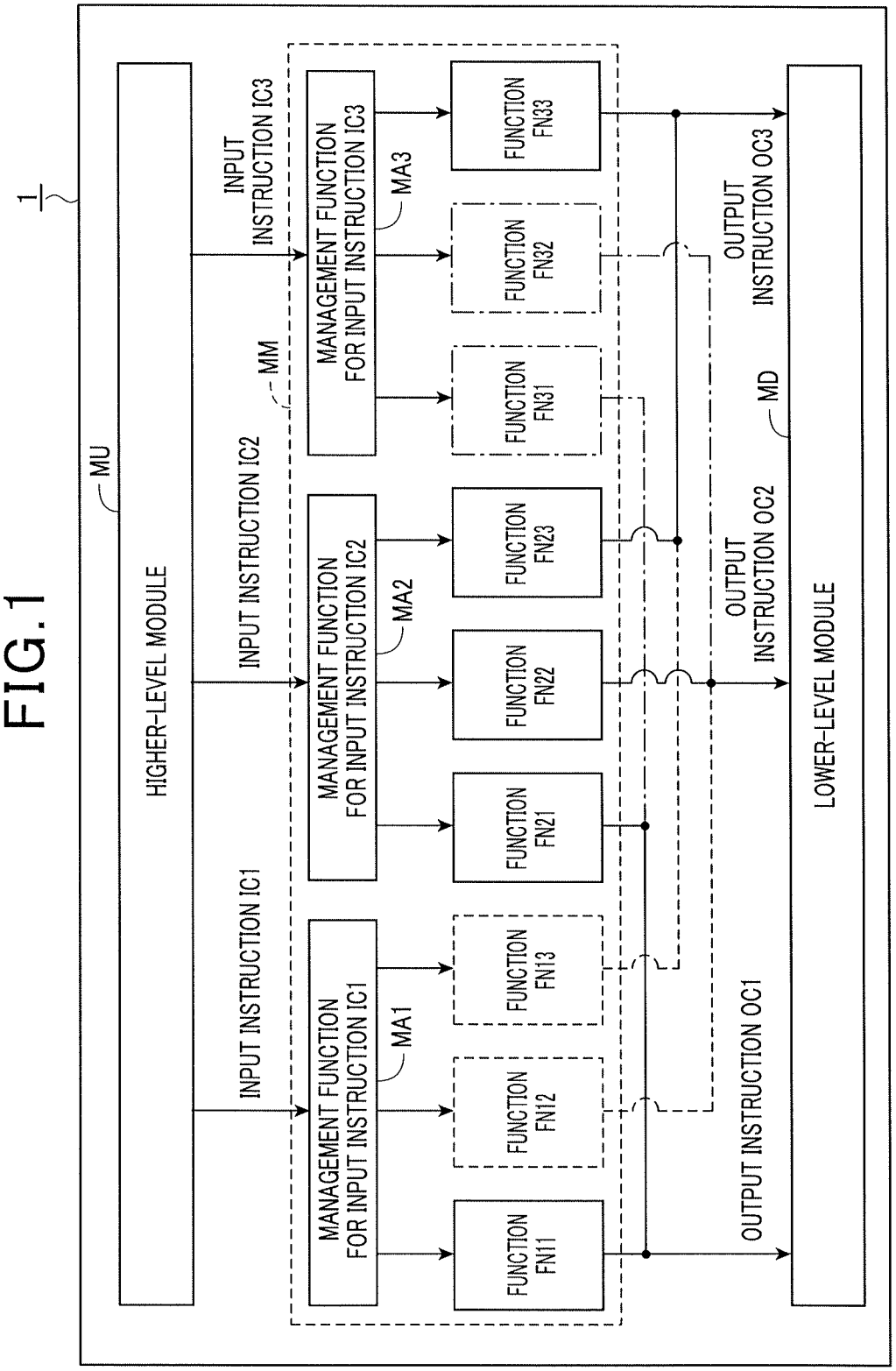
FIG. 1 is a block diagram schematically illustrating an example of the overall structure of an intermediate module to be installed in an electronic device according to an embodiment of the present disclosure.

Next, the method of generating the intermediate module MM will be described hereinafter with reference to FIGS. 1 and 2. (a) of FIG. 2 schematically illustrates the steps of the first stage of the method, and (b) of FIG. 2 schematically illustrates the steps of the second stage of the method.

In step S1 of the first stage, the method divides at least one function that should be implemented by the intermediate module MM into a plurality of functions each of which matches a corresponding one of combinations between one of the input instructions IC1, IC2, and IC3 and one of the output instructions OC1, OC2, and OC3.

If the number of input instructions is $\alpha$ and that of output instructions is $\beta$, there can be combinations that are as many as the product of $\alpha$ and $\beta$. So, in step S1, the at least one function is divided into the number of functions having the product of $\alpha$ and $\beta$. In this embodiment, because each of $\alpha$ and $\beta$ is equal to 3, the at least one function is divided into nine functions FN11, FN12, FN13, FN21, FN22, FN23, FN31, FN32, and FN33. A divided function for a corresponding one combination of one of the input instructions and one of the output instructions will be referred to as a "segmented function".

Specifically, the segmented function FN11 generates, based on the input instruction IC1, the output instruction OC1 for the lower-level module MD, the segmented function FN12 generates, based on the input instruction IC1, the output instruction OC2 for the lower-level module MD, and the segmented function FN13 generates, based on the input instruction IC1, the output instruction OC3 for the lower-level module MD.

The segmented function FN21 generates, based on the input instruction IC2, the output instruction OC1 for the lower-level module MD, the segmented function FN22 generates, based on the input instruction IC2, the output instruction OC2 for the lower-level module MD, and the segmented function FN23 generates, based on the input instruction IC3, the output instruction OC3 for the lower-level module MD.

The segmented function FN31 generates, based on the input instruction IC3, the output instruction OC1 for the lower-level module MD, the segmented function FN32 generates, based on the input instruction IC3, the output instruction OC2 for the lower-level module MD, and the segmented function FN33 generates, based on the input instruction IC3, the output instruction OC3 for the lower-level module MD.

The intermediate module MM can be designed to output, based on one input instruction, a limited number of output instructions. For example, the intermediate module MM can be designed to output, based on the input instruction IC1, only the output instruction OC1 without outputting the output instructions OC2 and OC3, and/or output, based on the input instruction OC3, only the output instruction OC3 without outputting the output instructions OC1 and OC2 so that no output instructions represented by dashed lines and long-dashed short-dashed lines in FIG. 1 are provided.

In this modification, which of output instructions combined with the input instruction IC1 is only the output instruction OC1, and which of output instructions combined with the input instruction IC3 is only the output instruction OC3. This results in that the number of combinations of one of the input instructions IC1, IC2, and IC3 and one of the output instructions OC1, OC2, and OC3 is a value lower than the product of a and β.

Following the division, the method defines management functions MA1, MA2, and MA3 for the respective input instructions IC1, IC2, and IC3 in step S2; each of the management functions MA1, MA2, and MA3 is designed to manage segmented functions for a corresponding one of the input instructions IC1, IC2, and IC3. If the segmented functions FN11, FN12, and FN13 cooperate to implement, for example, successive functions in response to an input instruction, correlation information between the segmented functions FN11, FN12, and FN13, such as the order of them in operation, may be lost. Thus, the management function MA1 is designed to manage operations of the segmented functions FN11, FN12, and FN13 in response to the input instruction IC1. For the same reason, the management function MA2 is designed to manage operations of the segmented functions FN21, FN22, and FN23 in response to the input instruction IC2, and the management function MA3 is designed to manage operations of the segmented functions FN31, FN32, and FN33 in response to the input instruction IC3.

Following step S2, the method defines (specifies), for each of the output instructions OC1, OC2, and OC3, at least one commonalized group of segmented functions in all segmented functions that are response to a common one of the output instructions OC1, OC2, and OC3 and respectively with different input instructions; the grouped segmented functions for each of the output instructions OC1, OC2, and OC3 commonalize program components in step S3. In this embodiment, these program components are object files in a library file to be provided.

However, if it is unnecessary to commonalize program components for an output instruction, there is no need to define groups of segmented functions in all segment functions for the output instruction.

Next, the method classifies the group of input instructions as at least one select input instruction and at least one basic input instruction in step S4; the at least one select input instruction is an input instruction that cannot be inputted to the intermediate module MM depending on the type of the higher-level module MU, and the at least one basic input instruction is an input instruction that is inputted to the intermediate module MM independently of the type of the higher-level module MU.

For example, let us assume an environment in which, as the higher-level module MU, any one of higher-level modules MU1, MU2, and MU3 is installed in the electronic device 1 in combination with the intermediate module MM; the higher-level module MU1 inputs the input instructions IC1, IC2, and IC3 to the intermediate module MM, the higher-level module MU2 inputs the input instructions IC1 and IC2 to the intermediate module MM, and the higher-level module MU3 inputs the input instructions IC2 and IC3 to the intermediate module MM.

In this environment, the method classifies the input instructions IC1 and IC3 as the select input instructions, and the input instruction IC2 as the basic input instruction.

Following step S4, the method generates, for each commonalized group, at least one combination program component that is shared by a corresponding combination of all segmented functions in a corresponding group in step S5.

Specifically, in step S5, the method generates, for each commonalized group, at least one combination program component that matches a corresponding one of combinations of all segmented functions in a corresponding commonalized group. In other words, the method generates, for each commonalized group defined in step S3, at least one combination program component that matches a corresponding one of combinations of the at least one select input instruction and the at least one basic input instruction to be inputted to the intermediate module MM. This eliminates at least one combination of segmented functions corresponding to at least one combination of only the at least one select input instruction non-inputted to the inter mediate module MM.

For example, let us assume that, in step S3, the method defines, for the output instruction OC3, a group of segmented functions FN11, FN21, and FN31 as a common group, and, in step S4, the input instruction IC2 is classified as the basic input instruction, and the input instructions IC1 and IC3 are classified as the select input instructions.

In this assumption, the combinations of the select input instructions and the basic input instruction to be inputted to the intermediate module MM include the first combination of the input instructions IC1, IC2, and IC3, the second combination of the input instructions IC1 and IC2, the third combination of the input instructions IC2 and IC3, and the fourth combination of the input instruction IC2 only.

Thus, as the plurality of combination program components in this assumption, the following first to fourth combination program components are generated in step S5 (see FIG. 3):

the first combination program component, which is used in the input of one of the input instructions IC1, IC2, and IC3 and is able to run statements corresponding to the segmented functions FN11, FN21, and FN31;

the second combination program component, which is used in the input of one of the input instructions IC1 and IC2 and is able to run statements corresponding to the segmented functions FN11 and FN21;

the third combination program component, which is used in the input of one of the input instructions IC2 and IC3 and is able to run statements corresponding to the segmented functions FN21 and FN31; and the fourth combination program component, which is used in the input of the input instruction IC2 and is able to run statements corresponding to the segmented function FN21 only.

Note that the fourth combination program component, which is used in the input of the input instruction IC2 and able to run statements corresponding to the segmented function FN21 only, is not a combination of segmented functions, but, in this embodiment and the present disclosure, such a program component corresponding to at least one function that aims to share the program component is expressed as a "combination program component" independently of the number of the at least one function.

On the other hand, in step S6, the method generates a single program component for each of segmented functions not to be shared, which are not included in each commonalized group defined in step S3. In step S6, the method also generates a single program component for each of the management functions. Each of the single program components generated in step S6 is designed to implement a corresponding one of the non-shared segment functions and the management functions.

After completion of step S6, the method exits all of the steps of the first stage.

In the second stage, the method extracts at least two of the program components generated in the first stage, such as the combination program components and the single program components, and links the extracted program components to generate the intermediate module MM meeting an environment of the electronic device 1 in which the intermediate module MM is to be implemented.

Specifically, the method identifies the combinations of the input instructions to be inputted to the intermediate module MM from the higher-level module MU in the electronic device 1 in which the intermediate module MM is to be installed in step S7. That is, as described above, whether a select input instruction is actually inputted to the intermediate module MM from the higher-level module MU is changed depending on the type of the higher-level module MU. Thus, in step S7, the method identifies the type of the higher-level module MU to thereby identify the combinations of the at least one select input instruction and the at least one basic input instruction to be inputted to the intermediate module MM from the higher-level module MU.

For example, in this embodiment, the method identifies the first combination of the input instructions IC1, IC2, and IC3, the second combination of the input instructions IC1 and IC2, the third combination of the input instructions IC2 and IC3, and the fourth combination of the input instruction IC2 only in step S7.

Following step S7, the method extracts, for each of the output instructions from the intermediate module MM, at least one combination program component and at least one single program component from the combination program components and single program components generated in the first stage in step S8; the extracted combination program component and single program component match the combinations of the input instructions and a corresponding one of the output instructions.

Specifically, in step S8, the method extracts the single program components respectively corresponding to the management functions each corresponding to one of the input instructions, and extracts the single program components each corresponding to one of the non-shared segmented instructions. In step S8, the method also extracts, for each commonalized group, a plurality of combination program components each of which matches a corresponding one of the identified combinations of the at least one select input instruction and the at least one basic input instruction to be inputted to the intermediate module MM.

Next, the method links the extracted program components with each other to generate the inter mediate module MM in step S9. Specifically, the method links the object files as the extracted program components with each other to generate an executable file of the intermediate module MM in step S9.

Note that the method runs steps S7 to S9 of the second procedure for each of the types of higher-level modules MU in the electronic device 1 in which the intermediate module MM is to be implemented. This generates a plurality of intermediate modules MM that meet the environment of the electronic device 1 in which the intermediate module MM is to be implemented.

As described above, the intermediate module generating method according to this embodiment makes it possible to simply generate, for each type of a higher-level module, an intermediate module MM that matches combinations of input instructions actually inputted to the intermediate module from the higher-level module by linking program components, which match the combinations of the input instructions, with each other. In other words, the intermediate module generating method according to this embodiment makes it possible not to incorporate, in the intermediate module MM to be generated, program components that match combinations of input instructions that are not actually inputted to the intermediate module.

Thus, the intermediate module generating method according to this embodiment efficiently generates the intermediate modules MM to be implemented in various types of electronic devices 1 with their sizes being limited.

Next, an example of various applications of the intermediate module generating method according to this embodiment will be described hereinafter with reference to FIGS. 4 to 8.

Specifically, in this example, the intermediate module generating method is applied to generation of a communication module MME as an intermediate module; this communication module MME has functions of: receiving each of an initialization instruction IC4, a data sending instruction IC5, and a data receiving instruction IC6 as input instructions from a higher-level module MU; and outputting, for each of the input instructions IC4, IC5, and IC6, a corresponding one of a communication initialization instruction OC4, a message sending instruction OC5, and a message receiving instruction OC6 for a lower-level module MD as an output instruction.

Note that an electronic device 1 according to this example, in which the communication module MME is to be implemented, is a node (ECU) to be installed in a vehicle. Implementation of the communication module MME in each node (ECU) provides communications among all nodes (ECUS) connected with or without wires to an in-vehicle LAN installed in the vehicle.

The ECUS (nodes) connected with the in-vehicle LAN include an ECU for transmitting data associated with the vehicle to another ECU, an ECU for receiving data associated with the vehicle and transmitted from another ECU, and an ECU for transmitting data associated with the vehicle to another ECU and for receiving, from another ECU, data indicative of the conditions of the vehicle that are not detected thereby, thus controlling the vehicle based on the received data.

It takes time and trouble to individually generate such a communication MME for each of the ECUS. Thus, the inter mediate module generating method is applied to generation of the communication module MME usable for each of the ECUS with its size being limited.

First, the first function required for the communication module MME will be described hereinafter with reference to FIG. 5; this first function is a function of, in response to the input of the initialization instruction IC4 from a higher-level module MU, such as a program for controlling the vehicle and another program, running a communication initialization and/or management routine. That is, the communication module MME is required to be configured as a program that allows at least one computer installed in the electronic device 1 (its own node) to run the communication initialization and/or management routine.

Specific steps of the communication initialization and/or management routine will be described hereinafter with reference to FIG. 5. When the communication initialization and/or management routine is launched, the initialization instruction IC4 for initializing a lower-level module MD is passed to the lower-level module MD in step S2110. This initializes communications of the lower-level module MD. Thereafter, an initialization message sending subroutine is performed in step S2120.

Specific steps of the initialization message sending subroutine are illustrated in (a) of FIG. 6. Referring to (a) of FIG. 6, an initialization message body for an initialization message to be sent is generated in step S2210. The initialization message body describes a message ID (identification), a participation flag, and data indicative of participating nodes (ECUS) participating in a network recognized by its own node, such as the in-vehicle LAN. The message ID describes the type of this initialization message to be transmitted, such as, an ID of the initialization message. The participation flag is a flag indicative of whether its own node is participating in the in-vehicle LAN. That is, if its own node is participating in the in-vehicle LAN, a value indicative of "participation" is described as the participation flag. Otherwise, if its own node is not participating in the in-vehicle LAN, a value indicative of "nonparticipation" is described as the participation flag. In this example, the value indicative of "participation" is described as the participation flag.

After generation of the initialization message body, ancillary data in a predetermined format is added to the generated message body so that a send message as the initialization message is generated in step S2220; this ancillary data is data independent of the message ID. For example, in this example, a cyclic redundancy check (CRC) as an example of error-detecting codes is described as the ancillary data. Thereafter, the message sending instruction OC5 including the send message (initialization message) to be transmitted is passed to the lower-level module MD in step S2230. This results in that the send message (initialization message) is broadcasted through the lower-level module MD to all of the other nodes (all ECUS except for its own node) connected with the in-vehicle LAN in step S2230, and thereafter, the initialization message sending subroutine in step S2120 is terminated.

Note that, because the communication module MME is to be installed in each node (each ECU) connected with the in-vehicle LAN, as a result of the subroutine S2120, the initialization messages are sent to each node from the other nodes connected with the in-vehicle LAN.

After step S2120, reception of the initialization messages sent from the other nodes is performed in step S2130. Specifically, the message receiving instruction OC6 is passed to the lower-level module MD; this message receiving instruction OC6 is to capture the initialization message sent from at least one other node via the lower-level module MD in step S2130. The participation flag of the captured initialization message allows at least one node participating in the in-vehicle LAN recognized by the at least one other node to be identified.

In step S2130, the data indicative of participating nodes participating in the in-vehicle LAN in the initialization message body to be sent from its own node is updated to the identified nodes.

Thereafter, in step S2140, it is determined whether the initialization message from the at least one other node includes its own node and whether the identified participating nodes in step S2130 are in agreement with the participating nodes recognized by its own node. If it is determined that either the initialization message from the at least one other node does not include its own node or the identified participating nodes are in disagreement with the participating nodes recognized by its own node (NO in step S2140), the operations in steps S2120 to S2140 are repeatedly carried out until the initialization message from the at least one other node includes its own node and the identified participating nodes in step S2130 are in agreement with the participating nodes recognized by its own node.

As result, if it is determined that the at least one other node includes its own node and the identified participating nodes in step S2130 are in agreement with the participating nodes recognized by its own node, the participating process (initialization process) between its own node and the at least one other node is completed (YES in step S2140), execution of the communication initialization and/or management routine goes to step S2150.

In step S2150 or thereafter, an initialization message sending subroutine in step S2160, which is identical to the initialization message sending subroutine in step S2120, and reception of the initialization messages sent from the other nodes in step S2170, which is identical to the reception of the initialization messages sent from the other nodes in step S2130, are carried out each time a predetermined period has elapsed. This allows the participating nodes recognized by each participating node in the in-vehicle LAN to be in agreement with those recognized by another participating node in the in-vehicle LAN.

These are the specific steps of the communication initialization and/or management routine to be carried out in response to the input of the initialization instruction IC4 from the higher-level module MU.

Second, the second function required for the communication module MME will be described hereinafter with reference to (b) of FIG. 6; this second function is a function of, in response to the input of the data sending instruction IC5 from the higher-level module MU, running a data sending routine. That is, the communication module MME is required to be configured as a program that allows at least one computer installed in the electronic device 1 (its own node) to run the data sending routine.

Specific steps of the data sending routine will be described hereinafter with reference to (b) of FIG. 6. When the data sending routine is launched, a message ID and target send data specified by the data sending instruction IC5 are merged with each other so that a message body is generated in step S2310. In the message body, an ID corresponding to the type of the target send data is stored as the message ID. In addition, ancillary data in the same fog mat as the initialization messages is added to the generated message body so that a send message is generated in step S2320; this ancillary data is data independent of the message ID. For example, in this embodiment, a CRC as an example of error-detecting codes is described as the ancillary data.

Thereafter, the message sending instruction OC5 including the send message to be sent is passed to the lower-level module MD in step S2330. This results in that the send message is outputted through the lower-level module MD to all of the other nodes, and thereafter, the data sending routine is terminated.

These are the specific steps of the data sending routine to be carried out in response to the input of the data sending instruction IC5 from the higher-level module MU.

In generating the communication module MM having the configuration set forth above, all of the functions as the communication module MME are divided into segmented functions for the respective input and output instructions IC4, IC5, IC6, OC4, OC5, and OC6 (see step S1 of FIG. 2 and FIG. 7). Note that the communication module MME is configured such that each of the message receiving instruction OC5 and OC6 is only outputted in response to the input of a corresponding one of the message sending instructions IC5 and IC6. Thus, five segmented functions FE1 to FE5 are obtained (see FIG. 7). Thereafter, management functions ME1 to ME3 are defined for the respective initialization instruction IC4, data sending instruction IC5, and data receiving instruction IC6 (see step S2 of FIG. 2).

After definition of the management functions ME1 to ME3, a number of segmented functions in all of the segmented functions are selected as a common group for each of the output instructions OC4 to OC6 (see step S3). Specifically, for the message sending instruction OC5, a group of the segmented function FE4 corresponding to the data sending routine (see (b) of FIG. 6) and the segmented function FE5 corresponding to the initialization message sending routine (see (a) of FIG. 6) is defined as a first commonalized group to make program components common. In addition, for the message receiving instruction OC6, a group of the segmented function FE5 and the segmented function FE3 is defined as a second commonalized group to make program components common.

Next, the initialization instruction IC4, the data sending instruction IC5, and the data receiving instruction IC6 are classified into at least one select input instruction or at least one basic input instruction (see step S4). In this example, the data sending instruction IC5 and the data receiving instruction IC6 are categorized into the group of at least one select input instruction, and the initialization instruction IC4 is categorized into the group of at least one basic input instruction.

Thereafter, a plurality of combination program components each of which matches a corresponding one of combinations of the select input instructions (IC5 and IC6) and the basic input instruction (IC4) to be inputted to the communication module MME is generated for each of the first commonalized group consisting of the segmented functions FE4 and FE2 and the second commonalized group consisting of the segmented functions FE5 and FE3 (see step S5).

Specifically, for the first commonalized group, because the data sending instruction IC5 corresponding to the segmented function FE4 is a select input instruction, the following combination program components are generated:

the first combination program component, which is used in the input of the initialization instruction IC4 and the data sending instruction IC5 and is able to run statements corresponding to the segmented functions FE4 and FE2; and the second combination program component, which is used when the initialization instruction IC5 is not inputted, in other words, the initialization instruction IC4 is only inputted, and is able to run statements corresponding to the segmented function FE2

Similarly, for the second commonalized group, because the data sending instruction IC6 corresponding to the segmented function FE5 is a select input instruction, the following combination program components are generated:

the third combination program component, which is used in the input of the initialization instruction IC4 and the data sending instruction IC6 and is able to run statements corresponding to the segmented functions FE5 and FE3; and the fourth combination program component, which is used when the data receiving instruction IC6 is not inputted, in other words, the initialization instruction IC4 is only inputted, and is able to run statements corresponding to the segmented function FE3

For example, how to generate the first combination program component for the first commonalized group from the segmented functions FE4 and FE2 will be schematically described with reference to FIG. 8. As illustrated in FIG. 8, the initialization message sending routine (see (a) of FIG. 6) includes steps S2220 and S2230 that are the same as steps S2320 and 2330 of the data sending routine (see (b) of FIG. 6). Thus, the first combination program component is generated to share the statements (program codes) corresponding to the common steps S2220 and S2230 (S2320 and S2330) (see FIG. 8).

The third combination program component for the second commonalized group can be generated in the same approach as the approach of generating the first combination program component for first commonalized group.

Thereafter, a single program component for the segmented function FE1 that is not included in each communalized group, and is generated for each of the management functions ME1, ME2, and ME3 (see step S6). The generated combination program components and the single program components are linked with each other so that the communication modules MME usable for the respective ECUS connected with the in-vehicle LAN can be generated (see steps S7 to S9).

For example, in order to generate a communication module MME to be installed in a target ECU designed not to send data to another node and to receive data from another node, the second combination program component corresponding to the segment function FE2 is selected without selection of the first communication program corresponding to the combination of the segment functions FE4 and FE2 for the first commonalized group, and the third combination program component corresponding to the combination of the segment functions FE3 and FE5 and the fourth combination program component corresponding to the segment function FE3 are selected for the second commonalized group. These selections of the communication program components generate the communication module MME to be installed in the target ECU.

Thus, the intermediate module generating method according to this example reduces the communication module MME in size in comparison to conventional communication modules.

As fully described above, the intermediate module generating method according to this embodiment is designed to generate an intermediate module by generating, for each commonalized group, a plurality of combination program components each of which matches a corresponding one of combinations of at least one select input instruction and at least one basic input instruction to be inputted to the intermediate module. This eliminates, from the finally generated intermediate module, at least one combination of segmented functions corresponding to combinations of select input instructions only; these combinations are not inputted to the intermediate module. This makes it possible to generate intermediate modules to be installed in various electronic devices with their sizes being limited.

In addition, the configuration of the intermediate module MM (MME) according to the embodiment allows the software structure of the intermediate module MM to be easily changed depending on the combinations of the input instructions from the higher-level module MU to be inputted to the intermediate module MM.

Specifically, in conventional standardized intermediate modules, a large number of functions, each of which is required for at least one of plural types of the higher-level modules MU, must be implemented in the electronic device 1 although some of the functions are not required for the types of the higher-level modules MU that are actually installed in the electronic device 1.

However, in the software intermediate modules MM according to this embodiment, these redundant functions, which are not required for the types of the higher-level modules MU that are actually installed in the electronic device 1, need not be implemented in the electronic device 1. Thus, even if the software intermediate module (standardized module) MM is considered to be used in various environments, such as in various devices, it is unnecessary to install, in the hardware intermediate module MM, a number of program codes whose corresponding functions are not required in an actual environment in which the intermediate module MM is used, in other words, in the electronic device 1 in which the intermediate module MM is actually installed. This feature unexpected from the conventional standardized intermediate modules limits the size (circuit size) of the intermediate module MM, resulting in reduced cost of manufacturing the intermediate module MM.

The intermediate module generating method according to this embodiment has been described. Next, an example of the structure and operations of a support device 100 usable for generating intermediate modules MM according to this embodiment will be described hereinafter with reference to FIGS. 9 to 28. The support device 100 illustrated in FIG. 9 is designed to support user's operations when users generate an intermediate module MM. More specifically, the support device 100 described hereinafter is designed to support user's operations to generate an intermediate module MM using an intermediate module generating method, which is more developed than the intermediate module generating method according to this embodiment.

The support device 100 illustrated in FIG. 9 is designed as, for example, a normal personal computer consisting of, for example, a computer unit 10, a display unit 20, an operating unit 30, an I/O (input and output) interface 40, and a storage unit 50. These units 10 to 50 are communicably connected with each other via buses 60.

The display unit 20 is comprised of, for example, a light crystal display for outputting, on its screen, various pieces of information as image information. The operating unit 30 is a user interface comprised of, for example, a keyboard and/or a pointing device. The operating unit 30 is operative to input, to the computer unit 10, various pieces of information entered by users in cooperation with the display unit 20. The I/O interface 40 is comprised of, for example, a USB interface, a magnetic disk drive, a CD/DVD drive, and the like. The I/O interface 40 is operative to externally input, to the support device 100, various items of data including programs and externally output various items of data from the support device 100.

The storage unit 50 is comprised of, for example, a hard disk drive in which various programs including application programs and data to be used by the various programs are stored.

The computer unit 10 is comprised of a CPU 11 and a RAM (main memory) 13. The CPU 11 is designed to run at least one of the programs stored in the storage unit 50 and loaded in the RAM 13 to thereby perform various tasks to support users to generate the intermediate modules MM.

Specifically, a first support tool, a second support tool, and a third support tool are installed beforehand in the storage unit 50 as application programs for supporting user's operations required to generate the intermediate modules MM. The CPU 11 is designed to perform various tasks to support users to generate the intermediate modules MM in accordance with an execution sequence (a running sequence) of the first to third support tools entered as an instruction from a user through the operating unit 30.

FIG. 10 is a flowchart schematically illustrating steps (instructions) of the first support tool to be executed by the CPU 11.

When launching the first support tool in response to the entering of a user's instruction to start the first support tool, the CPU 11 executes an instruction registering subroutine in step S100. Referring to FIG. 11, the operation in step S100 is designed to accept registering of input instructions to be inputted to a target intermediate module MM to be generated and output instructions to be outputted from the target intermediate module MM.

Specifically, when starting the instruction registering subroutine, the CPU 11 generates an array {I_na(n)} for storing ID codes of input instructions and an array {O_na(m)} for storing ID codes of output instructions in steps S110 and S115; each of the characters "n" and "m" represents a variable (array variable). Next, the CPU 11 resets the variable n to zero in step S120, and thereafter, performs step S130 and subsequent steps.

Specifically, the CPU 11 increments the variable n by 1 in step S130, displays an input instruction registering window on the screen of the display unit 20 for registering input instructions, prompting a user to enter an ID code of a first input instruction using the operating unit 30 in step S135. When a user enters the ID code of the first input instruction to be registered using the operating unit 30, the CPU 11 accepts the ID code of the first input instruction in step S135. Then, the CPU 11 sets the element I_na(n) of the array {I_na(n)} to the entered ID code in step S140.

The CPU 11 repeats the operations in steps S130 to S145 unless an instruction indicative of the completion of registering of input instructions is entered via the operating unit 30 (NO in step S145). In other words, the CPU 11 repeats the operations in steps S130 to S145 until an instruction indicative of the completion of registering of input instructions is entered via the operating unit 30. This results in that, after complete of the repeated operations, the array element I_na (1), the array element I_na(2), and the array element I_na(n) are successively registered in the RAM 13 or the storage unit 50.

Note that the ID codes of the input instructions to be registered are used when the structure of the target intermediate module MM is displayed on the screen of the display unit 20. Thus, as the ID code of each input instruction to be registered, a character string code indicative of the name and content of each input instruction to be registered can be entered.

If the instruction indicative of the completion of registering of input instructions is entered via the operating unit 30 (YES in step S145), the CPU 11 accepts registering of output instructions to be outputted from the target intermediate module MM in the same procedure as registering of input instructions set forth above.

Specifically, the CPU 11 resets the variable m to zero in step S150, and increments the variable m by 1 in step S160. Then, the CPU 11 displays an output instruction registering window on the screen of the display unit 20, prompting a user to enter an ID code of a first output instruction using the operating unit 30 in step S165. When a user enters the ID code of the first output instruction to be registered using the operating unit 30, the CPU 11 accepts the ID code of the first output instruction in step S165. Then, the CPU 11 sets the element O_na(m) of the array {O_na(m)} to the entered ID code in step S170.

The CPU 11 repeats the operations in steps S160 to S175 unless an instruction indicative of the completion of registering of output instructions is entered via the operating unit 30 (NO in step S175). In other words, the CPU 11 repeats the operations in steps S160 to S175 until an instruction indicative of the completion of registering of output instructions is entered via the operating unit 30. This results in that, after complete of the repeated operations, the array element O_na (1), the array element O_na(2), . . . , and the array element O_na(n) are successively registered in the RAM 13 or the storage unit 50. Note that the ID codes of the output instructions to be registered are used when the structure of the target intermediate module MM is displayed on the screen of the display unit 20. Thus, as the ID code of each output instruction to be registered, a character string code indicative of the name and content of each output instruction to be registered can be entered.

If the instruction indicative of the completion of registering of output instructions is entered via the operating unit 30 (YES in step S175), the CPU 11 terminates the instruction registering subroutine, going to step S200. Note that the number of the input instructions registered in the support device 100 will be represented as N (a natural number equal to or more than 1), and the number of the output instructions registered in the support device 100 will be represented as M (a natural number equal to or greater than 1).

In step S200, the CPU 11 executes a function registering subroutine illustrated in FIG. 12 for accepting registering of functions to be implemented by the target intermediate module MM.

Specifically, when starting the function registering subroutine, the CPU 11 generates a two-dimensional array {F1 (n1, m1)} with a size of N by (M+1) for storing therein ID codes of functions to be implemented in step S210; each of the characters "n1" and "m1" represents a variable. The reference character N represents the number of the input instructions, and the reference character M represents the number of the output instructions. Next, the CPU 11 displays a window of the list of all of the registered input instructions I_na(1) to I_na(N) on the screen of the display unit 20, prompting a user to select an input instruction using the operating unit 30 in step S220; this window will be referred to as an "input-instruction list window" hereinafter.

When a user selects an input instruction I_na(sn) using the operating unit 30, the CPU 11 accepts the selection of the input instruction I_na(sn) in step S220. The character "sn" represents a variable indicative of a selected one of the input instructions I_na(1), . . . , I_na(N).

Next, the CPU 11 generates a module layout window by laying out: the ID code of the selected input instruction I_na (sn); the ID code of each of the registered output instructions O_na(1) to O_na(M); an external functional block corresponding to each of the registered output instructions O_na (1) to O_na(M); at least one internal functional block; input lines directed from the selected input instruction I_na(sn) to the respective output and input functional blocks; and output lines directed from the output functional blocks to the respective registered output instructions O_na(1) to O_na(M) in step S230. Then, the CPU 11 displays the module layout window on the screen of the display unit 20 in step S230, as illustrated in the right of FIG. 12.

Note that, in the input instructions whose ID codes have been registered in the array elements I_na(1) to I_na(N), an input instruction whose ID code has been registered in the array element I_na(n) will be expressed as an input instruction I_na(n). This is the same as the registered output instructions.

In addition, note that "external functions" are functions with operations to output instructions to a lower-level module MD, which correspond to segmented functions described in the intermediate module generating method according to this embodiment. Note that "internal functions" are functions without operations to output instructions to the lower-level module MD. The external functional blocks to be displayed on the module layout window are blocks for displaying contents of external functions to be registered. Thus, the external functional blocks for the combinations of the selected input instruction I_na(sn) and each of the output instructions O_na (1) to O_na(M) are displayed on the module layout window.

After display of the module layout window, the CPU 11 initializes the variable m1 to zero in step S240, and performs step S251 and subsequent steps.

Specifically, the CPU 11 increments the variable m1 by 1 in step S251, and displays an external function registering window on the screen of the display unit 20 for registering external functions corresponding to the combinations of the input instruction I_na(sn) and each of the output instructions O_na (1) to O_na(M), prompting a user to enter an ID code of a first external instruction using the operating unit 30 in step 253.

When a user enters the ID code of the first external function (external function 1) to be registered using the operating unit 30, the CPU 11 accepts the ID code of the first external function in step S253. Then, the CPU 11 sets the element F1 (sn, 1) of the two-dimensional array {F1 (n1, m1)} to the entered ID code, and displays the ID code of the first external function on the external functional block of the module layout window; this external functional block corresponds to the array element F1 (sn, 1) and connected with the input line of the I_na(sn) and to the output line O_na(m1) in step S255. Note that the external function whose ID code is set to the array element F1 (sn, 1) will be expressed as an "external function F1 (n1, m1)".

The CPU 11 repeats the operations in steps S251 to S257 unless the value of the variable m1 is equal to or greater than the value M (NO in step S257). In other words, the CPU 11 repeats the operations in steps S251 to S257 until the value of the variable m1 is equal to or greater than the value M. This results in that, after complete of the repeated operations, the ID codes of the external functions (first external function, second external function, . . . , and the M-th external function) entered through the external function registering window are registered on the respective array element F1 (sn, 1), array element F1 (sn, 2), . . . , and array element F1 (sn, M) in this order.

Note that, as the ID code of each external function to be registered, a character string code indicative of the name and content of each external function to be registered can be entered. In step S253, the CPU 11 can accept the user's entered information representing that there are no external functions to be registered for corresponding array elements F1 (sn, m1). In this case, the CPU 11 can set a NULL code to the corresponding array elements F1 (sn, m1). For example, if no output instructions were provided for the input instruction I_na(sn), a user could enter, using the operating unit 30, such information representing that there are no external functions to be registered for the corresponding array elements F1 (sn, m1).

If the value of the variable m1 is equal to or greater than the value M (YES in step S257), the CPU 11 displays an internal function registering window on the screen of the display unit 20 for registering at least one internal function, prompting a user to enter an ID code of the at least one internal instruction using the operating unit 30 in step 260.

When a user enters the ID code of the at least one internal function to be registered using the operating unit 30, the CPU 11 accepts the ID code of the at least one internal function in step S260. Then, the CPU 11 sets the element F1 (sn, M+1) of the two-dimensional array {F1 (n1, m1)} to the entered ID code, and displays the ID code of the at least one internal function on the at least one internal functional block of the module layout window; this at least one internal functional block corresponds to the array element F1 (sn, 4) and connected with the input line of the I_na(sn) in step S270.

Subsequent to step S270, the CPU 11 repeats the operations in steps S220 to S280 unless all of the registered input instructions I_na(1) to I_na(N) have been selected (NO in step S280). In other words, the CPU 11 repeats the operations in steps S220 to S280 until all of the registered input instructions I_na(1) to I_na(N) have been selected (the variable sn has taken all of the values 1 to N). This results in that, after complete of the repeated operations, the ID codes of the external functions and the at least one internal instruction corresponding to all of the registered input instructions I_na (1) to I_na(N) have been registered. Thus, if it is determined that all of the registered input instructions I_na(1) to I_na(N) have been selected (YES in step S280), the CPU 11 terminates the function registering subroutine, going to step S300.

In step S300, the CPU 11 executes a registering subroutine of details of the internal functions illustrated in FIG. 13 for separating the at least one internal function for an input instruction I_na(sn) to be selected into a management function for controlling the operations of external functions and an individual function except for the management function.

Specifically, when starting the internal-function detail registering subroutine, the CPU 11 generates a two-dimensional array {T1 (n2, m2)} with a size of N by (M+2) for storing therein ID codes of management functions and individual functions to be implemented in step S310; each of the characters "n2" and "m2" represents a variable. Next, the CPU 11 sets each array element T1 (n2, m2) to the value of a corresponding element F1 (n2, m2) of the two-dimensional array {F1 (n2, m1)} where n2=1, 2, . . . , N, and m2=1, 2, . . . , M in step S315.

Then, the CPU 11 displays an input-instruction list window of all of the registered input instructions I_na(1) to I_na(N) on the screen of the display unit 20, prompting a user to select an input instruction using the operating unit 30 in step S320.

When a user selects an input instruction I_na(sn) using the operating unit 30, the CPU 11 accepts the selection of the input instruction I_na(sn) in step S320.

Next, the CPU 11 generates a module layout window by laying out: the ID code of the selected input instruction I_na (sn); the ID code of each of the registered output instructions O_na(1) to O_na(M); an external functional block corresponding to each of the registered output instructions O_na (1) to O_na(M); a management functional block and an individual functional block included in the at least one internal functional block; a first input line directed from the selected input instruction I_na(sn) to the management functional block; second input lines directed from the management functional block to the respective output functional blocks and the individual functional block; and output lines directed from the output functional blocks to the respective registered output instructions O_na(1) to O_na(M) in step S330. Then, the CPU 11 displays the module layout window on the screen of the display unit 20 in step S330, as illustrated in the right of FIG. 13.

After display of the module layout window, the CPU 11 displays a management function registering window on the screen of the display unit 20 for registering a management function corresponding to the input instruction I_na(sn), prompting a user to enter an ID code of the management function using the operating unit 30 in step 340.

When a user enters the ID code of the management function to be registered using the operating unit 30, the CPU 11 accepts the ID code of the management function in step S340. Then, the CPU 11 sets the element T1 (sn, M+2) of the two-dimensional array {T1 (n1, m1)} to the entered ID code, and displays the ID code of the management function on the management functional block of the module layout window in step S345.

Thereafter, the CPU 11 displays an individual function registering window on the screen of the display unit 20 for registering an individual function corresponding to the input instruction I_na(sn), prompting a user to enter an ID code of the individual function using the operating unit 30 in step 350.

When a user enters the ID code of the individual function to be registered using the operating unit 30, the CPU 11 accepts the ID code of the individual function in step S350. Then, the CPU 11 sets the element T1 (sn, M+1) of the two-dimensional array {T1 (n1, m1)} to the entered ID code, and displays the ID code of the individual function on the management functional block of the module layout window in step S355.

Thereafter, the CPU 11 repeats the operations in steps S320 to S360 unless all of the registered input instructions I_na(1) to I_na(N) have been selected (NO in step S360). In other words, the CPU 11 repeats the operations in steps S320 to S360 until all of the registered input instructions I_na(1) to I_na(N) have been selected. This results in that, after complete of the repeated operations, the ID codes of the management functions and the individual functions corresponding to all of the registered input instructions I_na(1) to I_na(N) have been registered. Thus, if it is determined that all of the registered input instructions I_na(1) to I_na(N) have been selected (YES in step S360), the CPU 11 terminates the internal-function detail registering subroutine, going to step S400.

In step S400, the CPU 11 executes a confirmation window displaying subroutine illustrated in FIG. 14 for prompting a user to confirm the structure of the target intermediate module MM to be generated again.

Specifically, when starting the confirmation window displaying subroutine, the CPU 11 generates an external-function confirm window by laying out: the ID code of each of the input instructions I_na(1) to I_na(N); the ID code of each of the output instructions O_na(1) to O_na(M); a plurality of blocks (external functional blocks) corresponding to the external functions F1 (n1, m1) where n1=1, 2, . . . , N, and m1=1, 2, . . . , M; input lines directed from each of the input instructions I_na(1) to I_na(N) to the corresponding external functional blocks F1 (n1, m1); and an output line directed from each of the external functional blocks F1 (n1, m1) to any one of the output instructions O_na(1) to O_na(M) in step S410. Then, the CPU 11 displays the external-function confirmation window on the screen of the display unit 20 in step S410, as illustrated in the upper right of FIG. 14. Note that the block of at least one external function being unregistered, such as the block of at least one external function whose ID code is set to the NULL code, can be undisplayed or grayed out.

After display of the external-function confirmation window, if a user's instruction indicative of proceeding of the confirmation window displaying subroutine is entered via the operating unit 30 (YES in step S420), the CPU 11 displays a window of the list of all of the registered output instructions O_na(1) to O_na(M) on the screen of the display unit 20, prompting a user to select an output instruction using the operating unit 30 in step S430; this window will be referred to as an "output-instruction list window" hereinafter.

Thereafter, when a user selects an output instruction O_na (sm) using the operating unit 30, the CPU 11 accepts the selection of the output instruction O_na(sm) in step S430. The character "sm" represents a variable indicative of a selected one of the output instructions O_na(1), . . . , O_na (M).

Next, the CPU 11 generates an external-function confirmation window for the output instruction O_na(sm) by laying out: the ID code of the selected output instruction O_na(sm); a plurality of blocks (external functional blocks) corresponding to the external functional blocks F1 (1, sm), F1 (2, sm), ..., F1 (N, sm) that outputs the selected output instruction O_na(sm); the input instructions I_na(1), I_na(2), ..., I_na(N) corresponding to the external functional blocks F1(1, sm), F1 (2, sm), ..., F1 (N, sm); an input line directed from each of the input instructions I_na(1) to I_na(N) to a corresponding one of the external functional blocks F1 (1, sm), F1 (2, sm), ..., F1 (N, sm); and output lines directed from the external functional blocks F1 (1, sm), F1 (2, sm), ..., F1 (N, sm) to the selected output instruction O_na(sm) in step S440. Then, the CPU 11 displays the external-function confirmation window for the selected output instruction O_na(sm) on the screen of the display unit 20 in step S440, as illustrated in the lower right of FIG. 14.

Thereafter, the CPU 11 determines whether a user's switching operation of the selected output instruction O_na (sm) to an alternative output instruction is entered via the operating unit 30 in step S450, and determines whether a user's instruction indicative of proceeding of the confirmation window displaying subroutine is entered via the operating unit 30 in step S460.

If a user's switching operation of the selected output instruction O_na(sm) to an alternative output instruction is entered via the operating unit 30 (YES in step S450), the CPU 11 performs the operations in steps S430 and S440 to thereby display the external-function confirmation window for the selected alternative output instruction. If a user's instruction indicative of proceeding of the confirmation window displaying subroutine is entered via the operating unit 30 (YES in step S460), the CPU 11 terminates the confirmation window displaying subroutine, going to step S500.

In step S500, the CPU 11 executes a segmentalizing subroutine illustrated in FIG. 15 for segmentalizing (subdividing) the external functions F1 (1, 1) to F1 (N, M) in accordance with user's instructions in order to support operations to obtain program components of an intermediate module MM with a complicated structure.

When starting the segmentalizing subroutine, the CPU 11 generates an array {DivF (n3, m3)} with a size of N by (M+1) for storing the number of segments in step S510. Next, the CPU 11 sets each element of the two-dimensional array {DivF (n3, m3)} to an initial value of 1 where n3=1, 2, ..., N, and m3=1, 2, ..., M+1 in step S515, and generates an array {F2 (n3, m3, l3)} in step S520. Subsequent to step S520, the CPU 11 sets each array element F2 (n3, m3, 1) to the value of a corresponding array element F1 (n2, m2) of the two-dimensional array {F1 (n2, m1)} where n2=1, 2, ..., N, and m2=1, 2, ..., M+1 in step S525.

Next, the CPU 11 generates a module layout window by laying out: the ID code of each of the input instructions I_na(1) to I_na(N); the ID code of each of the output instructions O_na(1) to O_na(M); a plurality of blocks corresponding to detailed functions F2 (n3, m3, l3) where n3=1, 2, ..., N, m3=1, 2, ..., M, and l3=1, 2, ..., DivF (n3, m3); input lines directed from each of the input instructions I_na(1) to I_na(N) to corresponding blocks F2 (n3, m3, l3); and an output line directed from each of the blocks F2 (n3, m3, l3) to any one of the output instructions O_na(1) to O_na(M) in step S530. Then, the CPU 11 displays the module layout window on the screen of the display unit 20 in step S530. Note that, in the segmentalizing subroutine, at least one function obtained by segmentalizing an external function in the external functions F1 (1, 1) to F1 (N, M) will be referred to as "detailed functions". FIG. 16 schematically illustrates the module layout window displayed on the screen of the display unit 20 in step S530. Note that, at the first time of the operation in step S530, the module layout window illustrated in the upper right of FIG. 14 is displayed on the screen of the display unit 20 because the array element DivF (n3, m3)=1.

After display of the module layout window, the CPU 11 displays an output-instruction list window of the list of all of the registered output instructions O_na(1) to O_na(M) on the screen of the display unit 20, prompting a user to select an output instruction using the operating unit 30 in step S540.

When a user selects an output instruction O_na(sm) using the operating unit 30, the CPU 11 accepts the selection of the output instruction O_na(sm) in step S540.

Next, the CPU 11 updates the module layout window displayed in step S530 to a module layout window for the selected output instruction O_na(sm) in step S545. Specifically, in step S545, the CPU 11 deletes, from the module layout window displayed in step S530, the ID codes of the output instructions O_na(1) to O_na(M) and the output lines corresponding thereto except for the ID code of the selected output instruction O_na(sm) and the output lines corresponding to the selected output instruction O_na(sm).

Thereafter, the CPU 11 displays an input-instruction list window of the list of all of the registered input instructions I_na(1) to I_na(N) on the screen of the display unit 20, prompting a user to select an input instruction using the operating unit 30 in step S550.

When a user selects an input instruction I_na(sn) using the operating unit 30, the CPU 11 accepts the selection of the input instruction I_na(sn) in step S550. Then, the CPU 11 establishes, as a target function to be segmentalized (segmented), an external function F1 (sn, sm) corresponding to the combination of the selected input instruction I_na(sn) and the selected output instruction O_na(sm), and displays a segment number (division number) entry window on the screen of the display unit 20, prompting a user to enter the number of segments using the operating unit 30 in step S560.

When a user enters the number of segments using the operating unit 30, the CPU 11 accepts the number of segments in step S560.

Then, the CPU 11 updates the value of the array element DivF (sn, sm) to the entered number of segments in step S565, and updates the block of the detailed function F2 (sn, sm, 1) in the module layout window to a number of blocks corresponding to the entered number of segments in step 569.

Specifically, in step S569, the CPU 11 updates the module layout window to a module layout window in which the blocks of the "DivF(sn, sm)" number of detailed functions F1 (sn, sm, 1), F2 (sn, sm, 2), ..., F2 (sn, sm, DivF (sn, sm) are laid out.

When a user selects a block corresponding to one detailed function F2(sn, sm, sl) in the detailed functions F1 (sn, sm, 1), F2 (sn, sm, 2), ..., F2 (sn, sm, DivF (sn, sm) on the module layout window using the operating unit 30, the CPU 11 accepts the selection of the block corresponding to the detailed function F2 (sn, sm, sl) in step S570, and displays a detailed function registering window for the selected detailed function F2 (sn, sm, sl), prompting a user to enter an ID code of the selected detailed function F2 (sn, sm, sl) in step S580. The character sl is a variable indicative of a selected one of the detailed functions F1 (sn, sm, 1), F2 (sn, sm, 2), ..., F2 (sn, sm, DivF (sn, sm).

When a user enters the ID code of the selected detailed function F2 (sn, sm, sa) using the operating unit 30, the CPU 11 accepts the ID code, and sets the array element F2 (sn, sm, sl) to the accepted ID code to thereby register it in step S585.

Then, in step S585, the CPU 11 displays, in the block corresponding to the array element F2 (sn, sm, sl) on the module layout window, the ID code of the registered detailed function F2 (sn, sm, s l) in step S585. Note that, in the segmentalizing subroutine, a detailed function whose ID code is set to the array element F2 (n3, m3, l3) will be expressed as a "detailed function F2 (n3, m3, l3)". Hereinafter, similar expressions using array elements as suffixes follow the rules of the external function F1 (n1, m1) and the detailed function F2 (n3, m3, l3).

Thereafter, the CPU 11 determines whether all ID codes corresponding to the detailed functions F2 (sn, sm, 1) to F2 (sn, sm, DivF (sn, sm)) have been registered in step S590. If it is determined that all ID codes corresponding to the detailed functions F2 (sn, sm, 1) to F2 (sn, sm, DivF (sn, sm)) have not been registered yet (NO in step S590), the CPU 11 returns to step S570, and repeatedly performs the operations in steps S570 to S590 until all ID codes corresponding to the detailed functions F2 (sn, sm, 1) to F2 (sn, sm, DivF (sn, sm)) have been completed.

Then, if it is determined that all ID codes corresponding to the detailed functions F2 (sn, sm, 1) to F2 (sn, sm, DivF (sn, sm)) have been registered (YES in step S590), the CPU 11 determines whether all input instructions corresponding to the selected output instruction O_na(sm) and required for corresponding external functions to be segmentalized have been selected in step S595. If it is determined that all input instructions corresponding to the selected output instruction O_na(sm) and required for corresponding external functions to be segmentalized have not been selected yet (NO in step S595), the CPU 11 returns to step S550, and repeatedly performs the operations in steps S550 to S595 until all input instructions corresponding to the selected output instruction O_na(sm) and required for corresponding external functions to be segmentalized have been selected.

If it is determined that all input instructions corresponding to the selected output instruction O_na(sm) and required for corresponding external functions to be segmentalized have been selected (YES in step S595), the CPU 11 proceeds to step S599. In step S599, the CPU 11 determines whether all of the output instructions O_na(1) to O_na(M) have been selected via the output-instruction list window. If it is determined that all of the output instructions O_na(1) to O_na(M) have not been selected yet via the output-instruction list window (NO in step S599), the CPU 11 returns to step S530.

In step S530, the CPU 11 updates the displayed module layout window to a new module layout window in which the ID code of each of the input instructions I_na(1) to I_na(N); the ID code of each of the output instructions O_na(1) to O_na(M); a plurality of blocks corresponding to detailed functions F2 (n3, m3, l3) including the blocks corresponding to the array elements F2 (sn, sm, sl) in which the ID codes of the registered detailed functions F2 (sn, sm, sl) are displayed; input lines directed from each of the input instructions I_na (1) to I_na(N) to corresponding blocks F2 (n3, m3, l3); and an output line directed from each of the blocks F2 (n3, m3, l3) to any one of the output instructions O_na(1) to O_na(M). Thereafter, the CPU 11 repeatedly performs the operations in steps S540 to S599 unless all of the output instructions O_na (1) to O_na(M) have been selected via the output-instruction list window (NO in step S599).

Then, if it is deter mined that all of the output instructions O_na(1) to O_na(M) have been selected via the output-instruction list window (YES in step S599), the CPU 11 terminates the segmentalizing subroutine, going to step S600.

In step S600, the CPU 11 executes a commonalized-group determining subroutine illustrated in FIG. 17 for grouping functions that share at least one program component in accordance with user's instructions.

When starting the commonalized-group determining subroutine, the CPU 11 generates a module layout window by laying out: the ID code of each of the input instructions I_na(1) to I_na(N); the ID code of each of the output instructions O_na(1) to O_na(M); a plurality of blocks corresponding to detailed functions F2 (n3, m3, l3) where n3=1, 2, . . . , N, m3=1, 2, . . . , M, and l3=1, 2, . . . , DivF (n3, m3); input lines directed from each of the input instructions I_na(1) to I_na(N) to corresponding blocks F2 (n3, m3, l3); and an output line directed from each of the blocks F2 (n3, m3, l3) to any one of the output instructions O_na(1) to O_na(M) in step S610 (see FIG. 16). Then, the CPU 11 displays the module layout window on the screen of the display unit 20 in step S610.

Subsequently, the CPU 11 generates a management array {FC2 (x, y, z)} in step S615; each of the characters "x", "y", and "z" represents a variable. The variable x expresses the group number, and the variable y expresses the element number in a corresponding group.

In step S620, the CPU 11 initializes the group number x to zero, and performs step S630 and subsequent steps.

Specifically, the CPU 11 increments the group number x by 1 in step S630, and displays an output-instruction list window of the list of all of the registered output instructions O_na(1) to O_na(M) on the screen of the display unit 20, prompting a user to select an output instruction using the operating unit 30 in step S640.

When a user selects an output instruction O_na(sm) using the operating unit 30, the CPU 11 accepts the selection of the output instruction O_na(sm) in step S640, and updates the module layout window displayed in step S610 to a module layout window for the selected output instruction O_na(sm) in step S650. For example, when the module layout window is displayed on the screen of the displaying unit 20 in step S230 and the output instruction O_na(1) is selected, the blocks corresponding to the detailed functions F2 (n3, 1, l3), that is, F2 (1, 1, 1), F2 (1, 1, 2), F2 (2, 1, 1), F2 (2, 1, 2), F2 (2, 1, 3), and F3 (3, 1, 1) are displayed in step S650.

In addition, the CPU 11 resets the element number y to zero in step S660.

Thereafter, the CPU 11 increments the element number y by 1 in step S671. At that time, when a user selects a detailed function F2 (n3, sm, l3) corresponding to the output instruction O_na(sm) and sharing at least one program component on the module layout window using the operating unit 30, the CPU 11 accepts the selection of the detailed function F2 (n3, sm, l3) in step S673. The selected detailed function will be represented as a "selected detailed function F2 (sn, sm, se)" hereinafter. Then, the CPU 11 sets the array element FC2 (x, y, 1) to the element number sn representing the corresponding input instruction I_na(sn), and sets the array element FC2 (x, y, 2) to the element number sl representing the corresponding detailed function in step S675. Thus, in the array elements FC2 (x, y, 1) and FC2 (x, y, 2), information for identifying a detailed function at the y-th element in the x-th group is recorded.

Thereafter, the CPU 11 determines whether all detailed functions that share at least one program component in the x-th group have been selected in step S677. If it is determined that all detailed functions that share at least one program component in the x-th group have not been selected yet (NO in step S677), the CPU 11 returns to step S671, and repeatedly performs the operations in steps S671 to S677 until all detailed functions that share at least one program component have been selected.

Then, if it is determined that all detailed functions that share at least one program component have been selected (YES in step S677), the CPU 11 sets the array element F2C (x, 0, 1) to the number y of elements in the x-th group, and sets the array element F2C (x, 0, 2) to the element number sm of the output instruction O_na(sm) in step S680.

As described above, the CPU 11 records, in the array elements FC2 (x, y, z), various items of information for identifying the output instruction corresponding to the x-th group, the number of detailed functions that share at least one program component and are included in the x-th group, and the detailed functions that share at least one program component and are included in the x-th group in steps S675 and S680.

Thereafter, the CPU 11 determines whether grouping of functions that share at least one program component is completed in step S690, and, upon determining that grouping of functions that share at least one program component is not completed (NO in step S690), the CPU 11 returns to step S630, and repeatedly performs the operations in steps S630 to S690 until grouping of functions that share at least one program component is completed.

Then, if it is determined that grouping of functions that share at least one program component is completed (YES in step S690), the CPU 11 sets the array element F2C (0, 0, 1) to the number x of the recorded groups, terminating the commonalized-group determining subroutine, going to step S700.

In step S700, the CPU 11 executes a sub-management function registering subroutine illustrated in FIG. 18 for registering functions that control detailed functions in at least one same external function, which have been obtained by segmentalizing the at least one same external function, in accordance with user's instructions; these functions will be referred to as "sub-management functions".

When starting the sub-management function registering subroutine, the CPU 11 generates an array {T2 (n4, m4, l4)} for storing ID codes of functions including sub-management functions in step S710; these characters n4, m4, and f4 are variables, and generates an array {DivT (n4, m4)} for storing the number of segments where n4=1, 2, . . . , N, and m4=1, 2, . . . , M+2 in step S715.

Thereafter, the CPU 11 sets each array element T2 (n4, m4, l4) to the value of a corresponding array element F2 (n4, m4, l4) with the same element numbers (n4, m4, l4) where n4= 1, . . . , N, m4=1, . . . , M, and l4=1, . . . , DivF (n4, m4), and sets each array element T2 (n4, m4, DivF (n4, m4)+1) to NULL in step S720. Next, the CPU 11 sets the array element T2 (n4, M+1, 1) to the value of the array element T1 (n4, M+1), sets the array element T2 (n4, M+1, 1) to the value of the array element T1 (n4, M+1), and sets the array element T2 (m4, M+2, 1) to the value of the array element T1 (m4, M+2) in step S725.

Subsequently, the CPU 11 sets the value of each array element DivT (n4, m4) where n4=1, . . . , N and m4=1, . . . , M to the value of a corresponding array element DivF (n4, m4) with the same element numbers (n4, m4), sets each array element DivT (n4, M+1) to 1, and sets each array element DivT (n4, M+2) to 1 in step S730.

Thereafter, the CPU 11 generates a module layout window by laying out:

the ID code of each of the input instructions I_na(1) to I_na(N);

the ID code of each of the output instructions O_na(1) to O_na(M);

a plurality of blocks corresponding to detailed functions T2 (n4, m4, l4);

a plurality of blocks corresponding to individual functions T2 (n4, M+1, 1);

a plurality of blocks corresponding to management functions T2 (n4, M+2, 1);

a block corresponding to the sub-management functions T2 (n4, m4, DivT (n4, m4)+1) for the respective external functions F1 (n4, m4);

input lines among the input instructions I_na(1) to I_na(N), the management function T2 (n4, M+2, 1), the sub-management functions T2 (n4, m4, DivT (n4, m4)+1), and the blocks of the detailed functions T2 (n4, m4, l4) and the individual functions T2 (n4, M+1, 1); and an output line directed from each of the blocks of the detailed functions T2 (n4, m4, l4) and the individual functions T2 (n4, M+1, 1) to any one of the output instructions O_na(1) to O_na(M) where n4=1, . . . , N, m4=1, . . . , M, and Q4= 1, . . . , DivT (n4, m4).

Then, the CPU 11 displays the module layout window on the screen of the display unit 20 in step S740.

For example, FIG. 19 is a view schematically illustrating the module layout window displayed in step S740. Note that, in FIG. 19, the sub-management functions are abbreviated to "SUB".

Thereafter, when a user selects a block corresponding to one sub-management function in the plurality of sub-management functions T2 (n4, m4, DivT (n4, m4)+1) on the module layout window using the operating unit 30, the CPU 11 accepts the selection of the block corresponding to the sub-management function (sn, sm, DivT (sn, sm)+1) in step S750. Next, the CPU 11 displays a sub-management function registering window for the selected sub-management function (sn, sm, DivT (sn, sm)+1), prompting a user to enter an ID code of the selected sub-management function (sn, sm, DivT (sn, sm)+1) in step S760.

When a user enters the ID code of the selected sub-management function (sn, sm, DivT (sn, sm)+1) using the operating unit 30, the CPU 11 accepts the ID code, and sets the array element T2 (sn, sm, DivT (sn, sm)+1) to the accepted ID code to thereby register it in step S770. Then, in step S770, the CPU 11 also displays, in the block corresponding to the array element T2 (sn, sm, DivT (sn, sm)+1) on the module layout window, the ID code of the registered sub-management function T2 (sn, sm, DiVT (sn, sm)+1) in step S770.

Thereafter, the CPU 11 determines whether all ID codes corresponding to the sub-management functions have been registered in step S780. If it is determined that all ID codes corresponding to the sub-management functions have not been registered yet (NO in step S780), the CPU 11 returns to step S740, and repeatedly performs the operations in steps S740 to S780 until all ID codes corresponding to the sub-management functions have been registered.

If it is determined that all ID codes corresponding to the sub-management functions have been registered (YES in step S780), the CPU 11 terminates the sub-management function registering subroutine, going to step S800.

In step S800, the CPU 11 executes a select-input instruction registering subroutine. The selective-input instruction registering subroutine illustrated in FIG. 20 is to accept user's setting operations of input instructions (select input instructions) in the input instructions I_na(1) to I_na(N), which cannot be inputted to the target intermediate module MM depending on the type of a higher-level modules MU. The select-input instruction registering subroutine is also to classify the input instructions to be inputted to the target intermediate module MM into the select input instructions and basic input instructions that are inputted to the target intermediate module MM independently of the type of the higher-level module MU.

When starting the select-input instruction registering subroutine, the CPU 11 generates an array {Dn (k)} for storing element numbers of the select input instructions where k is a variable in step S810, and initializes the variable k to zero in step S820. Next, the CPU 11 determines whether an instruction indicative of completion of registering of select input instructions is entered via the operating unit 30 in step S830.

Upon determining that the instruction indicative of completion of registering of select input instructions is not entered (NO in step S830), the CPU 11 increments the variable k by 1 in step S840, and displays an input-instruction list window of all of the registered input instructions I_na(1) to I_na(N) on the screen of the display unit 20, prompting a user to select an input instruction as a select input instruction using the operating unit 30 in step S850.

When a user selects an input instruction I_na(sn) as a select input instruction using the operating unit 30, the CPU 11 accepts the selection of the input instruction I_na(sn), and sets the array element Dn (k) to the element number sn of the selected input instruction I_na(sn) in step S860, returning to step S830. That is, the CPU 11 repeatedly performs the operations in steps S830 to S860 unless the instruction indicative of completion of registering of select input instructions is entered (NO in step S830). This allows the element numbers of the user's specified select input instructions to be successively set to the array elements Dn (1), Dn (2), . . . .

Thereafter, if it is determined that the instruction indicative of completion of registering of select input instructions is entered (YES in step S830), the CPU 11 sets the array element Dn (0) to the number k of the select input instructions in step S870, and terminates the select-input instruction registering subroutine, going to step S900.

In step S900, the CPU 11 executes a combination table generating subroutine illustrated in FIG. 21.

When starting the combination table generating subroutine, the CPU 11 sets a variable p to the value of the array element F2C (0, 0, 1) indicative of the total number of the groups of functions that share at least one program component in step S910, and performs step S915 and subsequent steps to thereby generate a combination table for each of the groups.

Specifically, the CPU 11 determines whether the value of the variable p is greater than zero in step S915. If it is determined that the value of the variable p is greater than zero (YES in step S915), the CPU 11 generates a combination table for the p-th group based on the value of the array element F2C (p, 0, 1) representing the number of the detailed functions included in the p-th group in step S920. Note that the combination table to be generated in step S920 is a table showing the combination patterns of the input instructions to be inputted to the target intermediate module MM, in other words, the combination patterns of the input instructions to be inputted to the intermediate module MM and the input instructions to be non-inputted thereto.

For example, as schematically illustrated in the thick frame at the top of FIG. 22, the combination table for the p-th group is a two-dimensional array consisting of N×r elements (records); this character r represents the number of possible combination patterns of the input instructions to be inputted to the intermediate module MM and the input instructions to be non-inputted thereto. When a value of "1" described in an element of the combination table shows that a corresponding input instruction is inputted to the intermediate module MM, and a value of "0" described in an element of the combination table shows that a corresponding input instruction is not inputted thereto.

For each detailed function included in the p-th group, the input instructions from the higher-level module MU are grouped into two categories: input instructions to be inputted to the intermediate module MM; and input instructions to be non-inputted thereto. In this embodiment, the detailed functions are so categorized into the plurality of groups that some detailed functions each corresponding to the same input instruction can not be included in a same group. Thus, the total number of the combination patterns of the input instructions corresponding to the p-th group is expressed as 2 raised to the F2C (p, 0, 1)-th power.

To sum up, in step S920, the CPU 11 generates a combination table {TLCP (p, q, r)} describing the combination patterns of the input instructions corresponding to the detailed functions included in the p-th group; these combination patterns depend on whether these input instructions are inputted to the intermediate module MM, and have the number of 2 raised to the F2C (p, 0, 1)-th power. Reference character TLCP (p, q, r) represents an element (table element) at the q-th row and the r-th column in the combination table for the p-th group; the variable p represents the number of a corresponding group, the reference character q represents an element number in the p-th group, and the reference character r represents the number of a corresponding combination.

More specifically, a table element TLCP (p, q, r) is a value of 1 or 0 at the r-th combination pattern, which shows whether an input instruction I_na(F2C (p, q, 1)) corresponding to a detailed function at the element number q in the p-th group where p>0, q>0, and r>0. If a table element TLCP (p, q, r) takes 1, it shows that an input instruction I_na(F2C (p, q, 1)) is inputted to the intermediate module MM from the higher-level module MU, and otherwise if a table element TLCP (p, q, r) takes 0, it shows that an input instruction I_na(F2C (p, q, 1)) is not inputted to the intermediate module MM from the higher-level module MU.

An example illustrated in the top of FIG. 22 demonstrates that the table element TLCP (p, 1, 6) is equal to 1 and the table element TLCP (p, 2, 6) is equal to 0, and the table element TLCP (p, 3, 6) is equal to 1. This results in that, in the sixth combination pattern, the input instruction I_na(F2C (p, 1, 1)) and the input instruction I_na(F2C (p, 3, 1)) are inputted to the intermediate module MM, and the input instruction I_na(F2C (p, 2, 1)) is not inputted to the intermediate module MM.

As additional information, in this embodiment, storing, in a table element TLCP (p, q, 0), the value of a corresponding array element F2C (p, q, 1) representing the element number of an input instruction I_na(F2C (p, q, 1)) corresponding to a detailed function at the element number q in the p-th group allows the combination table to be generated.

Note that, in step S920, the CPU 11 groups each input instruction into two categories: an input instruction to be inputted to the intermediate module MM; and an input instruction to be non-inputted thereto without distinguishing each input instruction between a basic input instruction and a select input instruction to thereby generate the combination table {TLCP (p, q, r)} describing the total number of the combination patterns of input instructions corresponding to the p-th group expressed as the 2 raised to the F2C (p, 0, 1)-th power. However, because basic input instructions must be inputted to the intermediate module MM, there is no need to consider combination patterns in which basic input instructions are non-inputted to the intermediate module MM. For this point, the CPU 11 corrects the combination table described later.

After generation of the combination table {TLCP (p, q, r)} for the p-th group, the CPU 11 decrements the value of the variable p by 1 in step S925, returning to step S915. Thereafter, the CPU 11 repeatedly performs the operations in steps S915 to S925 until it is determined that the value of the variable p is equal to or smaller than zero. This allows the combination tables for the first to the p-th groups of functions that share at least one program component to be generated.

Thus, if it is determined that the value of the variable p becomes zero after the combination table for the first group (p=1) has been generated (NO in step S915), the CPU 11 resets the variable p to zero in step S930, and increments the variable p by 1 in step S940. Thereafter, the CPU 11 initializes the variable q to zero in step S945, performing step S950 and subsequent steps.

Specifically, in step S950, the CPU 11 determines whether the value of the variable p is equal to or smaller than the total number of the groups based on the value of the array element F2C (0, 0, 1) showing the total number of the groups. If it is determined that the value of the variable p is equal to or smaller than the total number of the groups (YES in step S950), the CPU 11 goes to step S955, and otherwise (NO in step S950), the CPU 11 terminates the combination table generating subroutine, going to step S1000.

In step S955, the CPU 11 updates the value of the variable q by incrementing it by 1, and determines whether the value of the variable q is equal to or smaller than the total number of the elements in the p-th group based on the value of the array element F2C (p, 0, 1) representing the number of elements in the p-th group in step S960. If it is determined that the value of the variable q is equal to or smaller than the total number of the elements in the p-th group (YES in step S960), the CPU 11 performs step S970 and subsequent steps, and, otherwise (NO in step S960), going to step S940. Specifically, the combination table generating subroutine is programmed to perform the operations in step S970 and subsequent steps for each element in the p-th group. After completion of the operations in step S970 and subsequent steps for all of the elements in the p-th group, the CPU 11 jumps to step S955. That is, the CPU 11 performs the operations in step S970 and subsequent steps for each element in the p-th group, and, when the operations in step S970 and subsequent steps are completed, the CPU 11 goes to step S940. That is, the operations in step S970 and subsequent steps are carried out for each element in each group.

Specifically, in step S970, the CPU 11 determines whether the input instruction I_na(F2C (p, q, 1)) corresponding to the detailed function at the q-th element in the p-th group is unregistered in the array {Dn (k)}, thus determining whether the input instruction I_na(F2C (p, q, 1)) is a basic input instruction in step S970. Note that, if the input instruction I_na(F2C (p, q, 1)) is a basic input instruction, it is not registered in the array {Dn (k)}.

If it is determined that the input instruction I_na(F2C (p, q, 1)) is not a basic input instruction, in other words, is a select input instruction (NO in step S970), the CPU 11 returns to step S955, increments the variable q by 1 in step S955, and performs the operations in step S960 and subsequent steps. That is, the CPU 11 performs the operations in step S960 and subsequent steps for the next element in the p-th group.

Otherwise, if it is determined that the input instruction I_na(F2C (p, q, 1)) is a basic input instruction (YES in step S970), the CPU 11 resets the value of the variable r to zero in step S975, and performs the operations in step S980 and subsequent steps.

Specifically, in step S980, the CPU 11 updates the variable r by incrementing it by 1, and determines whether the value of the variable r is equal to or less than 2 raised to the F2C (p, 0, 1)-th power representing the total number of the combination patterns of the input instructions corresponding to the p-th group in step S985.

If it is determined that the value of the variable r is equal to or less than 2 raised to the F2C (p, 0, 1)-th power (YES in step S985), the CPU 11 determines whether the table element (p, q, r) is zero in step S990. If it is determined that the table element (p, q, r) is zero (YES in step S990), the CPU 11 sets the value of each of the table elements TLCP (p, q, r) corresponding to the r-th combination pattern in the p-th group where q=1, . . . , F2C (p, 0, 1) to NULL in step S995, and thereafter, going to step S980.

Otherwise, if it is determined that the table element (p, q, r) is not zero (NO in step S990), the CPU 11 jumps to step S980 without performing the operation in step S995. Thus, the CPU 11 repeatedly performs the operations in steps S980 to S995 until the value of the variable r is more than 2 raised to the F2C (p, 0, 1)-th power. That is, the CPU 11 repeatedly performs the operations in steps S980 to S995 to thereby set, to NULL, the table elements of an improper combination pattern in which a basic input instruction is not entered, thus correcting the combination table.

Thereafter, if the operations in steps S980 to S995 corresponding to all of the combination patterns have been performed so that the value of the variable r is more than 2 raised to the F2C (p, 0, 1)-th power (NO in step S985), the CPU 11 goes to step S955, and performs the operations in steps S960 and subsequent steps for the next element in the p-th group.

Note that the bottom of FIG. 22 demonstrates an example of the structure of a combination table that has been obtained by correcting the combination table illustrated in the top of FIG. 22 in steps S930 to S995.

That is, the bottom of FIG. 22 shows how to correct the combination table illustrated at the top of FIG. 22 if the input instruction I_na(F2C (p, 3, 1)).

After the combination-table generating operation, the CPU 11 goes to step S1000 illustrated in FIG. 10, and displays the combination table for each group on the screen of the display unit 20. Specifically, the CPU 11 displays, for each group, an output window of the corresponding combination table describing the ID codes of the input instructions corresponding to the detained functions included in a corresponding group, and the combination patterns of the input instructions as illustrated in the bottom of FIG. 22 in step S1000. In step S1000, the CPU 11 also displays, on the output window, the ID codes of the output instructions. As a result, in step S1000, the combination patterns of the input instructions from the higher-level module MU for each of the groups of functions that share at least one program component are displayed on the screen of the displaying unit 20 as image information.

Note that, in step S1000, in accordance with a user's instruction through the operating unit 30, a combination table previously displayed can be switched to a combination table corresponding to the user's specified group by the instruction, or the combination tables for the respective groups can be all displayed on the screen of the displaying unit 20.

The displaying operation in step S1000 has continued until an exit instruction for the first support tool is entered via the operating unit 30. If an exit instruction for the first support tool is entered via the operating unit 30 (YES in step S1010), the CPU 11 stores, in the storage unit 50, the results of the first support tool, such as work data indicative of the combination patterns of the input instructions from the higher-level module MU for each of the groups of functions that share at least one program component in step S1020. The operation in step S1020 allows the results of the first support tool to be used in the second support tool. Thereafter, the CPU 11 exits the first support tool.

In accordance with the combination table for each group displayed by the first support tool, a user generates at least one combination program component for each combination pattern of the input instructions from the higher-level module MU. Specifically, for each combination pattern except for the improper combination patterns, a user combines, with each other, detailed functions corresponding to input instructions to be inputted to the intermediate module MM while omitting detailed functions corresponding to input instructions to be non-inputted to the intermediate module MM, thus generating a combination program component for implementing the combined detailed functions for each combination pattern (see FIG. 10).

In addition, a user generates a single program component for each detailed function unclassified in each group, for each sub-management function, for each management function, and for each individual function (see FIG. 10).

After generation of the program components, a user instructs the CPU 11 to run the second support tool via the operating unit 30. In response to a user's instruction to run the second support tool, the CPU 11 launches the second support tool whose steps are illustrated in FIG. 23.

When launching the second support tool, the CPU 11 reads the work data as the results of the first support tool from the storage unit 50 in step S1100, and generates a combination program-component management table {TLCPP (p, q, r)} in step S1110. Specifically, in step S1110, the CPU 11 sets each table element TLCPP (p, q, r) to the value of a corresponding element TLCP (p, q, r) of the combination table {TLCP (p, q, r)} (see FIG. 24). Next, the CPU 11 generates a single program-component management table {TLIPP (u, v, w)} in step S1120. As illustrated in FIG. 25, the CPU 11 sets each table element TLIPP (u, v, 0) to a corresponding array element Div (u, v) as the number of segments corresponding to an input instruction I_na(u) and an output instruction O_na(v).

Thereafter, the CPU 11 resets the value of the variable p to zero in step S1130, and performs step S1140 and subsequent steps to accept registering of combination program components for each group.

Specifically, the CPU 11 increments the variable p by 1 to thereby update the target of combination program components to be registered to the p-th group in step S1140. Subsequently, the CPU 11 accepts a user's instruction to register a combination program component corresponding to each combination pattern of input instructions in the p-th group except for the improper combination patterns, and obtains the combination program component to be registered via the I/O interface 40 to store it at a given location of the storage unit 50 in step S1150. Then, in step S1150, the CPU 11 registers, as registration information, the location of the combination program component in the storage unit 50 in a corresponding element TLCPP (p, 0, r) of the combination program-component management table {TLCPP (p, q, r)} (see FIG. 24). For example, the registration information of a combination program component corresponding to the r0-th combination pattern in the combination table {TLCP (p0, q, r)} for the p-th group is registered in a table element TLCPP (p0, 0, r0).

Note that, when registering a combination program component, the CPU 11 can register, in the single program-component management table, link information accessible to the registration information of the combination program component in the combination program-component management table. For example, if a combination program component to be registered is a program component for implementing a function T2 (u, v, r), the CPU 11 can register, in a corresponding element TLIPP (u, v, r) of the single program-component management table, the element number in the combination program-component management table at which the registration information of the combination program has been described.

The CPU 11 repeatedly performs the operations in steps S1140 and S1150 until the value of the variable p is equal to or greater than the total number of the groups (NO in step S1160) to thereby accept an alternative combination program component corresponding to each group. Specifically, if it is determined that the value of the variable p is equal to or greater than the total number of the groups (YES in step S1160), the CPU 11 displays a window of the list of all functions each of which should register a single program component in step S1170; these functions include the detailed functions unclassified into the groups, the individual functions, the management functions, and the sub-management functions. This prompts a user to select a function that should register a single program component on the window of the list using the operating unit 30 in step S1170.

When a user selects a function T2 (u, v, r) using the operating unit 30, the CPU 11 accepts the selection of the function T2 (u, v, r) in step S1170. In addition, the CPU 11 accepts a user's instruction to register the selected function T2 (u, v, r), and obtains the single program component to be registered via the I/O interface 40 to store it at a given location of the storage unit 50 in step S1180. Then, in step S1180, the CPU 11 registers, as registration information, the location of the single program component in the storage unit 50 in a corresponding element TLIPP (u, v, r) of the single program-component management table {TLIPP (u, v, r)} (see FIG. 25).

The CPU 11 repeatedly performs the operations in steps S1170 and S1180 until it is determined that all single program components have been registered (NO in step S1190). If it is determined that all single program components have been registered (YES in step S1190), in order to allow the third support tool to read the generated combination program-component management table and single program-component management table, the CPU 11 updates the readout work data in step S1100 by adding, to the readout work data, the generated combination program-component management table and single program-component management table, and stores the updated work data in the storage unit 50 in step S1195, terminating the second support tool.

After completion of the program components, in generating the target intermediate module MM to be installed in the electronic device 1, a user instructs the CPU 11 to run the third support tool via the operating unit 30. In response to a user's instruction to run the third support tool, the CPU 11 launches the third support tool whose steps are illustrated in FIG. 26.

When launching the third support tool, the CPU 11 reads the work data as the results of the second support tool from the storage unit 50 in step S1200. Next, the CPU 11 proceeds to step S1300 and performs an input/non-input instruction determining subroutine illustrated in FIG. 27. The input/non-input instruction determining subroutine is to obtain, from a user via the operating unit 30, information associated with the select input instructions non-inputted to the intermediate module MM in the input instructions I_na(1) to I_na(N).

When launching the input/non-input instruction determining subroutine, the CPU 11 generates an array {DnP(k)} in step S1310, and initializes the variable k to zero in step S1320. Thereafter, the CPU 11 performs step S1330 and subsequent steps.

In step S1330, the CPU 11 increments the variable k by 1, and deter mines, based on the value of the array element Dn(0) indicative of the total number of the select input instructions, whether the value of the variable k is equal to or less than the total number of the select input instructions in step S1340. Upon determining that the value of the variable k is equal to or less than the total number of the select input instructions (YES in step S1340), the CPU 11 displays a window for querying whether the input instruction I_na(Dn(k)) pointed out by the array element Dn(k) is to be inputted to the intermediate module MM to a user in step S1351. When a user enters information representing whether the input instruction I_na(Dn(k)) is to be inputted to the intermediate module MM via the operating unit 30 on the inquiry window, the CPU 11 accepts the information entered by the user.

If the information representing that the input instruction I_na(Dn(k)) is to be inputted to the intermediate module MM (YES in step S1353), the CPU 11 sets the array element DnP(k) to 1 in step S1355. Otherwise, the information representing that the input instruction I_na(Dn(k)) is to be non-inputted to the intermediate module MM (NO in step S1353), the CPU 11 sets the array element DnP(k) to 0 in step S1357, returning to step S1330.

Then, the CPU 11 repeatedly performs the operations in steps S1330 to S1357 until the value of the variable k is more than the total number of the select input instructions (YES in step S1340). That is, the CPU 11 asks a user as to whether each select input instruction registered in the array {Dn(k)} is to be inputted to the intermediate module MM, and obtains, from a user, information indicative of whether each input select instruction is inputted to the intermediate module MM, thus storing the information in a corresponding one of the array elements DnP(k).

If it is determined that the value of the variable k is more than the total number of the select input instructions (NO in step S1340), the CPU 11 recognizes that the information indicative of each of the select input instructions has been obtained. Then, the CPU 11 sets the array element DnP(0) to the value of the array element Dn(0), that is, the total number of the select input instructions in step S1360, and thereafter, terminates the input/non-input instruction determining subroutine, going to step S1400.

In step S1400, the CPU 11 performs a module output subroutine illustrated in FIG. 28.

When launching the module output subroutine, the CPU 11 resets the variable p to zero in step S1410, and performs step S1420 and subsequent steps.

Specifically, the CPU 11 increments the variable p by 1 in step S1420, and determines whether the value of the variable p is equal to or less than the total number of the groups in step S1421. If it is determined that the value of the variable p is equal to or less than the total number of the groups (YES in step S1421), the CPU 11 references the combination program-component management table {TLCPP (p, q, r)} to thereby retrieve, from the combination program components of the p-th group stored in the storage unit 50, a combination program component corresponding to the combination pattern of input instructions to be inputted to the intermediate module MM pointed out by the array {DnP(k)} in step S1425, returning to step S1420.

The CPU 11 performs the operations in steps S1420 to S1425 until the value of the variable p is more than the total number of the groups. That is, the CPU 11 retrieves, from the storage unit 50, a combination program component as a program component to be used; this combination program component corresponds to the combination pattern of input instructions to be inputted to the intermediate module MM pointed out by the array {DnP(k)} for each group.

After the operation in step S1425 has been performed for all of the groups so that the value of the variable p exceeds the total number of the groups (NO in step S1421), the CPU 11 proceeds to step S1430. In step S1430, the CPU 11 references the single program-component management table {TLIPP (u, v, w)} to thereby retrieve, as program components to be used, single program components corresponding to functions out of registration of program components.

Note that the single program components to be retrieved are single program components corresponding to: the detailed functions unclassified into each group, the sub-management functions each for controlling the operation of a corresponding at least one detailed function, the management functions each for controlling the operation of a corresponding at least one detailed function through a corresponding sub-management function, and the individual functions. However, single program components for management functions, sub-management functions, detailed functions, and individual functions, which correspond to input instructions non-inputted to the intermediate module MM, are not the single program components to be retrieved.

After the operation in step S1430, the CPU 11 calculates the sum of the sizes of the single program components retrieved as the program components to be used in step S1440; the sum will be referred to as a value ZIP.

Subsequently, the CPU 11 calculates the sum of the sizes of the combination program components retrieved as the program components to be used in step S1450; the sum will be referred to as a value ZCP.

Additionally, the CPU 11 identifies a combination program component (maximum combination program component) with its size being the largest in the sizes of the combination program components for each group, and calculates the sum of the sizes of the maximum combination program components for the respective groups in step S1460; the sum will be referred to as a value ZM.

Thereafter, the CPU 11 calculates, as the size of the group of the program components efficiently reduced in size by the support tools, a value ZA1 by adding the value ZCP to the value ZIP, and calculates, as the conventional size of the group of the program components including the functions corresponding to select input instructions non-inputted to the intermediate module MM, a value ZA2 by adding the value ZM to the value ZIP in step S1470. Note that the maximum combination program component for a group is probably a program component to be used when all of the select input instructions are inputted to the intermediate module MM. For this reason, the value ZA2 is approximately in agreement with the size of program components to be used in the intermediate module MM when the intermediate module MM is generated without considering whether the select input instructions are inputted to the intermediate module MM like the approach described in the SUMMARY of the present application.

After the operation in step S1470, the CPU 11 generates a program-size information window by describing: the value ZA1, the value ZA2 as the program size of the intermediate module MM being generated without the support tools, and a value Δ of the subtraction of the value ZA2 from the value ZA1 as the amount of reduction in program-size using the support tools in the program-size information window in step S1480. Then, the CPU 11 displays the program-size information window on the screen of the display unit 40.

Subsequently, the CPU 11 merges the combination program components retrieved as the program components to be used and the single program components retrieved as the program components to be used to generate the set of structural components of the intermediate module MM, and outputs the set of the structural components of the intermediate module MM to a given area in the support device 100, such as a previously user-specified area in the storage unit 50, and a storage medium inserted in the I/O interface 40 in step S1490.

Note that, in place of the operation in step S1490, the CPU 11 can link the program components retrieved as the program components to be used with each other to generate an executable program (an executable file) of the intermediate module MM as a finished program product in step S1491. The specific steps to link the program components retrieved as the program components to be used with each other to generate an executable file of the intermediate program module MM depend on the program language of each of the retrieved program components. Thus, the descriptions of the specific steps can be omitted.

As described above, the support device 100 according to this embodiment efficiently supports users to generate the intermediate module MM, thus efficiently generating the intermediate modules MM with their sizes being limited.

Specifically, the support device 100 displays the combination table as visible information for each of the output instructions; this combination table shows the combination patterns of input instructions. Thus, the support device 100 allows uses to visibly recognize the combination patterns of input instructions from the combination table, making it possible for users to facilitate the user's tasks to generate combination program components for each of the combination patterns.

Particularly, the support device 100 groups, for each of the groups of detailed functions for sharing at least one program component, select input instructions from the higher-level module MU into two categories: first select input instructions to be inputted to the intermediate module MM; and second select input instructions to be non-inputted thereto. Then, the support device 100 displays, for each of the groups, information indicative of the combination patterns of the first select input instructions as the combination table. This allows, for each of the groups, information indicative of what kinds of combination program components are generated to be displayed for users simply and comprehensibly.

In addition, a user's input of information of select input instructions to be inputted to the intermediate module MM to be generated to the support device 100 allows the support device 100 to provide users the set of program components to be appropriately installed in the intermediate module MM. Thus, the support device 100 makes it possible to facilitate the user's efforts to generate the intermediate module MM.

As described above, the present disclosure provides a method of generating an intermediate module, which comprises a plurality of structural components, in a plurality of modules to be installed in an electronic device, the plurality of modules including a higher-level module higher in level than the intermediate module, and a lower-level module lower in level than the intermediate module. The intermediate module has at least one function and is designed to generate, for a plurality of input instructions inputtable thereto, a plurality of output instructions, respectively, for the lower-level module, and pass, to the lower-level module, the plurality of output instructions. The method includes the steps of:

dividing the at least one function into a plurality of segmented functions each of which matches a corresponding one of combinations of one of the plurality of input instructions and one of the plurality of output instructions;

specifying at least one commonalized group of segmented functions in a part of the plurality of segmented functions, the part of the plurality of segmented functions being response to a common one of the plurality of output functions, the specified segmented functions in the at least one commonalized group communalizing at least one of the structural components of the intermediate module;

classifying the plurality of input instructions as at least one select input instruction and at least one basic input instruction, the at least one select input instruction being designed such that whether the at least one select input instruction is inputted or non-inputted to the intermediate module depends on a type of the higher-level module, the at least one basic input instruction being designed to be inputted to the intermediate module independently of the type of the higher-level module;

eliminating at least one combination of segmented functions in all of the segmented functions in the at least one commonalized group specified by the specifying, the at least one combination of the segmented functions corresponding to at least one combination of only the at least one select input instruction non-inputted to the intermediate module;

generating at least one combination component as one of the plurality of structural components of the intermediate module, the at least one combination component being shared by a corresponding combination of the remaining segmented functions in the at least one commonalized group after the elimination;

generating at least one single component as one of the plurality of structural components of the intermediate module, the at least one single component implementing at least one segmented function in the plurality of segmented functions, the at least one segmented function being unclassified into the at least one commonalized group; and generating the intermediate module by linking the at least one combination component and the at least one single component with each other.

In the method according to the present disclosure, the dividing step can be implemented by the procedure in step S1, the specifying step can be implemented by the procedure in step S3, the classifying step can be implemented by the procedure in step S4, the eliminating step and the combination-component generating steps can be implemented by the procedure in step S5, the single-component generating step can be implemented by the procedure in step S6, and the intermediate-module generating step can be implemented by the procedures in steps S7 to S9.

In addition, the present disclosure provides a device for supporting a user to generate an intermediate module in a plurality of modules to be installed in an electronic device, the plurality of modules including a higher-level module higher in level than the intermediate module, and a lower-level module lower in level than the intermediate module, the inter mediate module being designed to generate, for a plurality of input instructions inputtable thereto, a plurality of output instructions, respectively, for the lower-level module, and pass, to the lower-level module, the plurality of output instructions. The device includes a user-operable input interface, an output interface, and an instruction information obtainer configured to obtain, via the user-operable input interface, first information representing a group of the plurality of input instructions and a group of the plurality of output instructions. The device includes a select-input information obtainer configured to obtain, via the user-operable input interface, second information representing at least one select input instruction in the plurality of input instructions represented by the first information. The at least one select input instruction is designed such that whether the at least one select input instruction is inputted or non-inputted to the intermediate module depends on a type of the higher-level module. The device includes an info illation provider configured to generate, based on the second information obtained by the select-input information obtainer, third information representing a plurality of patterns of combinations of the plurality of input instructions according to whether the at least one select input instruction is to be inputted or non-inputted to the intermediate module, and to provide, through the output interface, the third information as user-recognizable first image information.

In the device, the instruction information obtainer can be implemented by the instruction registering subroutine to be executed by the CPU 11, the select-input information obtainer can be implemented by the select-input instruction registering subroutine to be executed by the CPU 11, and the information provider can be implemented by the procedures in steps S900 to S1000 to be executed by the CPU 11.

The present disclosure is not limited to this embodiment, and therefore can use one of various modifications. For example, the intermediate module MM according to this embodiment is constructed as a software module, but it can be constructed as a hardware module (hardware circuit) to be installable in the electronic device 1.

FIG. 29 is a block diagram schematically illustrating an example of the structure of an electronic device 1' according to a modification of this embodiment.

Specifically, as well as the method illustrated in FIG. 4, the intermediate module generating method according to this embodiment is applied to generation of a hardware communication module MME1 as a hardware intermediate module; this communication module MME1 has functions of: receiving each of an initialization instruction IC4, a data sending instruction IC5, and a data receiving instruction IC6 as input instructions from a higher-level module MU; and outputting, for each of the input instructions IC4, IC5, and IC6, a corresponding one of a communication initialization instruction OC4, a message sending instruction OC5, and a message receiving instruction OC6 for a lower-level module MD as an output instruction.

Referring to FIG. 29, the intermediate module MME1 includes a board 110 and circuit chips 135 and 136 mounted on/in the board 110. The board 110 includes input process circuits 114, 115, and 116 formed therein/thereon for the respective input instructions IC4, IC5, and IC6; each of the input processing circuits 114, 115, and 116 is designed to implement a management function and an individual function defined for a corresponding input instruction. The intermediate module MME1 also includes an output processing circuit 124, a first receptacle 125, and a second receptacle 126 formed on the board 110. The output processing circuit 124 is operative to implement an individual function defined for the output instruction (communication initialization instruction) OC4. The first receptacle 125 is designed to removably receive a first circuit chip 135, which implements a function corresponding to the output instruction (message sending instruction) OC5, with the first circuit chip 135 being electrically connected (linked) with the input processing circuits 114 and 115. The second receptacle 126 is designed to removably receive the second circuit chip 136, which implements a function corresponding to the output instruction (message receiving instruction) OC6, with the second circuit chip 136 being electrically connected (linked) with the input processing circuits 114 and 116.

Specifically, each of the input processing circuits 114, 115, and 116, and the output processing circuit 124 is a corresponding conductor pattern formed directly on/in the board 110.

The input processing circuit 114 to accept the input of the initialization instruction IC4 is a circuit with an input terminal (not shown) to which the input instruction IC4 can be inputted; this circuit can implement the management function ME1 corresponding to the initialization instruction IC4 (see FIG. 7). The input processing circuit 114 has an output terminal electrically connected with input terminals of the respective output processing circuit 124, first receptacle 125, and second receptacle 126 via corresponding conductive lead paths formed on/in the board 110.

The input processing circuit 115 to accept the output of the data sending instruction IC5 is a circuit with an input terminal (not shown) to which the data sending instruction IC5 can be inputted; this circuit can implement the management function ME2 corresponding to the data sending instruction IC5 (see FIG. 7). The input processing circuit 115 has an output terminal electrically connected with an alternative input terminal of the first receptacle 125 via a corresponding conductive path formed on/in the board 110.

Similarly, the input processing circuit 116 to accept the output of the data receiving instruction IC6 is a circuit with an input terminal (not shown) to which the data receiving instruction IC6 can be inputted; this circuit can implement the management function ME3 corresponding to the data receiving instruction IC6 (see FIG. 7). The input processing circuit 116 has an output terminal electrically connected with an alternative input terminal of the second receptacle 126 via a corresponding conductive path formed on/in the board 110.

The output processing circuit 124 is designed as a circuit that can carry out a task corresponding to the segment function FE1 that outputs the communication initialization instruction OC4 in response to the input of the initialization instruction IC4 (see FIG. 7). That is, in response to the input of the initialization instruction IC4, the output processing circuit 124 outputs the communication initialization instruction OC4 to the lower-level module MD via its output terminal (not shown).

The first receptacle 125 includes a socket in which the first circuit chip 135 to output the message sending instruction OC5 in response to the input of a signal from the input processing circuit 114 or 115 is fittable; this socket has an output end with which the lower-level module MD is electrically connected. The first receptacle 125 also includes an output terminal for outputting the message sending instruction OC5 to the lower-level module MD via the output end of the socket. For example, the first receptacle 125 is designed such that these socket and output terminal are formed on/in the board 110.

The second receptacle 126 includes a socket in which the second circuit chip 136 to output the message receiving instruction OC6 in response to the input of a signal from the input processing circuit 114 or 116 is fittable; this socket has an output end with which the lower-level module MD is electrically connected. The second receptacle 126 also includes an output terminal for outputting the message receiving instruction OC6 to the lower-level module MD via the output end of the socket. For example, the second receptacle 126 is designed such that these socket and output terminal are formed on/in the board 110.

The socket of the first receptacle 125 is designed to receive one of a circuit chip 135*a* and a circuit chip 135*b* prepared as the circuit chip 135; these circuit chips 135*a* and 135*b* are provided for the respective combinations of the input instructions to the first receptacle 125.

Specifically, the circuit chip 135 is provided in plurality for the respective combinations of the input instructions to the first receptacle 125; each of the plurality of circuit chips 135 is, for example, a custom designed circuit having a function corresponding at least one combination program component according to this embodiment. For example, the circuit chip 135a corresponding to one of the combinations of the input instructions to the first receptacle 125 or the circuit chip 135b corresponding to an alternative one of the combinations of the input instructions to the first receptacle 125 is fitted in the first receptacle 125; the one of the combinations of the input instructions to the first receptacle 125 or the circuit chip 135b corresponds to an instruction to be actually inputted to the intermediate module MME1 from the higher-level module MU, and the alternative one of the combinations of the input instructions to the first receptacle 125 or the circuit chip 135b corresponds to an alternative instruction to be actually inputted to the intermediate module MME1 from the higher-level module MU.

More specifically, the initialization instruction IC4 is an input instruction (basic input instruction) that is inputted to the intermediate module MME1 independently of the type of the higher-level module MU. In contrast, each of the data sending instruction IC5 and the data receiving instruction IC6 is an input instruction (select input instruction) that is selectively inputted or non-inputted to the intermediate module MME 1 depending on the type of the higher-level module MU.

The circuit chip 135a is fitted in the socket of the first receptacle 125 if the higher-level module MU is designed such that the initialization instruction IC4 and the data sending instruction IC5 are inputted to the intermediate module MME1; this circuit chip 135a is obtained by combining the segmented functions FE4 and FE2 (see FIG. 7) with each other. The circuit chip 135b is fitted in the socket of the first receptacle 125 if the higher-level module MU is designed such that the initialization instruction IC4 is inputted to the intermediate module MME1 without the data sending instruction IC5 inputted thereto; this circuit chip 135b implements the segmented function FE2 (see FIG. 7).

The socket of the second receptacle 126 is designed to receive one of a circuit chip 136a and a circuit chip 136b prepared as the circuit chip 136; these circuit chips 136a and 136b are provided for the respective combinations of the input instructions to the second receptacle 126.

Specifically, the circuit chip 136 is provided in plurality for the respective combinations of the input instructions to the second receptacle 126; each of the plurality of circuit chips 136 is, for example, a custom designed circuit having a function corresponding at least one combination program component according to this embodiment. For example, the circuit chip 136a corresponding to one of the combinations of the input instructions to the second receptacle 126 or the circuit chip 136b corresponding to an alternative one of the combinations of the input instructions to the second receptacle 126 is fitted in the second receptacle 126; the one of the combinations of the input instructions to the second receptacle 126 or the circuit chip 136b corresponds to an instruction to be actually inputted to the intermediate module MME1 from the higher-level module MU, and the alternative one of the combinations of the input instructions to the second receptacle 126 or the circuit chip 136b corresponds to an alternative instruction to be actually inputted to the intermediate module MME1 from the higher-level module MU.

For example, the circuit chip 136a is fitted in the socket of the second receptacle 126 if the higher-level module MU is designed such that the initialization instruction IC4 and the data receiving instruction IC6 are inputted to the intermediate module MME1; this circuit chip 136a is obtained by combining the segmented functions FE5 and FE3 (see FIG. 7) with each other. The circuit chip 136b is fitted in the socket of the second receptacle 126 if the higher-level module MU is designed such that the initialization instruction IC4 is inputted to the inter mediate module MME1 without the data receiving instruction IC6 inputted thereto; this circuit chip 136b implements the segmented function FE2 (see FIG. 7).

The configuration of the intermediate module MME1 according to the modification allows the circuit structure of the intermediate module MME1 to be easily changed depending on the combinations of the input instructions from the higher-level module MU to be inputted to the intermediate module MME1.

Specifically, in conventional hardware standardized intermediate modules, a large number of functions, each of which is required for at least one of plural types of the higher-level modules MU, must be formed on a board although some of the functions are not required for the types of the higher-level modules MU that are actually installed in the electronic device 1'.

However, in the hardware intermediate modules MME1 according to the modification, these redundant functions, which are not required for the types of the higher-level modules MU that are actually installed in the electronic device 1', need not be formed on the board 110. Thus, even if the hardware intermediate module (standardized module) MME1 is considered to be used in various environments, such as in various devices, it is unnecessary to install, in the hardware intermediate module MME1, a number of program codes whose corresponding functions are not required in an actual environment in which the intermediate module MME1 is used, in other words, in an actual device in which the intermediate module MME1 is installed. This feature unexpected from the conventional hardware standardized intermediate modules limits the size (circuit size) of the intermediate module MME1, resulting in reduced cost of manufacturing the intermediate module MME1.

The specific structure of the hardware intermediate module MME1 has been described. Next, let us describe an example of applying the method of generating the software intermediate module MM according to this embodiment, which is illustrated in FIG. 2, to a method of generating the hardware intermediate module MME1 with reference to FIG. 2.

In step S1 of the first stage, the method divides at least one function that should be implemented by the intermediate module MME1 into a plurality of functions each of which matches a corresponding one of combinations of one of the input instructions IC1, IC2, and IC3 and one of the output instructions OC1, OC2, and OC3.

Following the division, the method defines management functions MA1, MA2, and MA3 for the respective input instructions IC1, IC2, and IC3 in step S2.

Thereafter, the method defines, for each of the output instructions OC1, OC2, and OC3, at least one commonalized group of segmented functions that are implemented by a common circuit chip in step S3. Specifically, in step S3, the method selects, for each of the output instructions OC1, OC2, and OC3, segmented functions in all segmented functions that are associated with a common one of the output instructions OC1, OC2, and OC3 and respectively with different input instructions; and groups the selected segmented functions for each of the output instructions OC1, OC2, and OC3 as the at least one commonalized group of segmented functions that are implemented by a common circuit chip in step S3.

Next, the method classifies the group of input instructions as at least one select input instruction or at least one basic input instruction in step S4. Thereafter, the method generates, for each commonalized group, at least one common circuit chip that is shared by a corresponding combination of all segmented functions in a corresponding group in step S5.

Specifically, in step S5, the method generates, for the commonalized group of the segmented functions FE4 and FE2, the common circuit chip 135a shared by the segmented functions FE4 and FE2 and the common circuit chip 135b corresponding to the segmented function FE2. In step S5, the method also generates, for the commonalized group of the segmented functions FE5 and FE3, the common circuit chip 136a shared by the segmented functions FE5 and FE5 and the common circuit chip 136b corresponding to the segmented function FE3.

Next, the method directly forms, on/in the board 110, a circuit, such as the output processing circuit 124, which is not included in each commonalized group defined in step S3, and directly forms, on/in the board 110, a plurality of circuits (the input processing circuits 114, 115, and 116) respectively for implementing the management functions corresponding to the respective input instructions IC4, IC5, and IC6 in step S6.

Specifically, the method generates the circuit chip for each combination of the input instructions to be inputted to the intermediate module MME1 in step S5. Then, the method forms, on the board 110, each of the first and second receptacles 125 and 126 for a corresponding one of the groups in step S6.

In step S6, the method electrically connects, with the input terminal of each of the first and second receptacles 125 and 126, the output terminal of a corresponding one of the plurality of circuits (the input processing circuits 114, 115, and 116) for implementing the management functions corresponding to the respective input instructions IC4, IC5, and IC6; each of the first and second receptacles 125 and 126 serves as a signal input path for a corresponding one of the first pair of circuit chips 135a and 135b and the second pair of circuit chips 136a and 136b.

After completion of step S6, the method exits all of the steps of the first stage.

In the second stage, the method implements one chip of the first pair of circuit chips 135a and 135b and one chip of the second pair of circuit chips 136a and 136b on/in the board 110 via the respective first and second receptacles 125 and 126 to thereby generate the inter mediate module MME1 that meets an environment of the electronic device 1' in which the intermediate module MME1 is to be implemented.

Specifically, the method identifies the type of the higher-level module MU to thereby identify the combinations of the select input instructions IC5 and IC6 and the basic input instruction IC4 to be inputted to the intermediate module MME1 from the identified higher-level module MU in step S7. Then, the method extracts, for each of the first and second receptacles 125 and 126, one circuit chip, which matches a corresponding one of the identified combinations, in the generated circuit chips in the first stage in step S8.

Thereafter, the method implements the extracted chip for the first receptacle 125 on the first receptacle 125, and the extracted chip for the second receptacle 126 on the second receptacle 126 to thereby generate the intermediate module MME1.

As described above, the intermediate module generating method according to the modification makes it possible to simply generate an inter mediate module that matches combinations of input instructions actually inputted to the intermediate module from a higher-level module by combinations of circuit chips to be implemented. In other words, the intermediate module generating method according to the modification makes it possible not to incorporate, in the intermediate module to be generated, circuit chips that match combinations of input instructions that are not actually inputted to the inter mediate module.

Thus, the intermediate module generating method according to the modification efficiently generates the intermediate modules to be implemented in various types of electronic devices with their sizes being limited.

While an illustrative embodiment of the present disclosure has been described herein, the present disclosure is not limited to the embodiment described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be constructed as non-exclusive.

What is claimed is:

1. A method of generating an intermediate module, which comprises a plurality of structural components, in a plurality of modules to be installed in an electronic device, the plurality of modules including a higher-level module higher in level than the intermediate module, and a lower-level module lower in level than the intermediate module, the intermediate module having at least one function and designed to generate, for a plurality of input instructions input thereto, a plurality of output instructions, respectively, for the lower-level module, and pass, to the lower-level module, the plurality of output instructions, the method comprising:

dividing the at least one function into a plurality of segmented functions each of which matches a corresponding one of combinations of one of the plurality of input instructions and one of the plurality of output instructions;

specifying at least one commonalized group of segmented functions in a part of the plurality of segmented functions, the part of the plurality of segmented functions being response to a common one of the plurality of output instructions, the specified segmented functions in the at least one commonalized group to make common at least one of the structural components of the intermediate module;

classifying the plurality of input instructions as at least one select input instruction and at least one basic input instruction, the at least one select input instruction being designed such that whether the at least one select input instruction is inputted or non-inputted to the intermediate module depends on a type of the higher-level module, the at least one basic input instruction being designed to be inputted to the intermediate module independently of the type of the higher-level module;

eliminating at least one combination of segmented functions in all of the segmented functions in the at least one commonalized group specified by the specifying, the at least one combination of the segmented functions corresponding to at least one combination of only the at least one select input instruction non-inputted to the intermediate module;

generating at least one combination component as one of the plurality of structural components of the intermediate module, the at least one combination component being shared by a corresponding combination of the remaining segmented functions in the at least one commonalized group after the elimination;

generating at least one single component as one of the plurality of structural components of the intermediate module, the at least one single component implementing at least one segmented function in the plurality of segmented functions, the at least one segmented function being unclassified into the at least one commonalized group; and generating the intermediate module by linking the at least one combination component and the at least one single component with each other.

2. The method according to claim 1, wherein the generating at least one combination component is to generate the combination component in plurality as a part of the plurality of structural components of the intermediate module, each of the plurality of combination components being shared by a corresponding combination of the remaining segmented functions in the at least one commonalized group after the elimination, the generating at least one single component is to generate the single component in plurality; and the generating the intermediate module is to:

identify, for the at least one commonalized group, combinations of a number of the plurality of input instructions to be actually inputted to the intermediate module;

extract, for the at least one commonalized group, one of the plurality of combination components corresponding to at least one combination of the plurality of input instructions to be actually inputted from the higher-level module to the intermediate module, and one of the plurality of single components corresponding to each input instruction included in the at least one combination of the plurality of input instructions to be actually inputted from the higher-level module to the intermediate module; and link the one of the plurality of combination components and the one of the plurality of single components to generate the intermediate module.

3. The method according to claim 1, further comprising:

defining, for each of the plurality of input instructions, a management function that manages at least one of the plurality of segmented functions, the at least one of the plurality of segmented functions being responsive to a corresponding one of the plurality of input instructions; and generating one of the plurality of structural components of the intermediate module, the one of the plurality of structural components of the intermediate module implementing the management function, wherein the generating the intermediate module comprising:

generating the intermediate module by linking the one of the plurality of structural components, the at least one combination component, and the at least one single component with each other.

4. The method according to claim 1, wherein the intermediate module is a program for instructing a computer installed in the electronic device to generate, in response to input of one of the plurality of input instructions from the higher-level module, an instruction, and output, to the lower-level module, the instruction as one of the plurality of output instructions.

5. The method according to claim 1, wherein the intermediate module is a hardware circuit, the generating at least one combination is to generate a circuit chip as the at least one combination component by removably forming the circuit chip on a board, and the generating at least one single component is to generate a circuit as the at least one single component by directly forming the circuit on the board, further comprising:

forming, for the at least one commonalized group, a receptacle on the board, the receptacle allowing the circuit chip to be received on the board with the circuit chip being electrically connected (linked) with the circuit directly formed on the board, the generating the intermediate module being to generate the intermediate module by fitting the circuit chip to the receptacle to electrically link the circuit chip with the circuit directly formed on the board.

6. The method according to claim 5, further comprising:

defining, for each of the plurality of input instructions, a management function that manages at least one of the plurality of segmented functions, the at least one of the plurality of segmented functions being responsive to a corresponding one of the plurality of input instructions; and generating, as the circuit corresponding to the at least one single component, a management circuit, which implements the management function, by directly forming the management circuit on the board.

7. A device for supporting a user to generate an intermediate module in a plurality of modules to be installed in an electronic device, the plurality of modules including a higher-level module higher in level than the intermediate module, and a lower-level module lower in level than the intermediate module, the intermediate module being designed to generate, for a plurality of input instructions input thereto, a plurality of output instructions, respectively, for the lower-level module, and pass, to the lower-level module, the plurality of output instructions, the device comprising:

a user-operable input interface;

an output interface; and a computer processor, the computer processor being programmed with:

an instruction information obtainer configured to obtain, via the user-operable input interface, first information representing a group of the plurality of input instructions and a group of the plurality of output instructions;

a select-input information obtainer configured to obtain, via the user-operable input interface, second information representing at least one select input instruction in the plurality of input instructions represented by the first information, the at least one select input instruction being designed such that whether the at least one select input instruction is inputted or non-inputted to the intermediate module depends on a type of the higher-level module; and an information provider configured to generate, based on the second information obtained by the select-input information obtainer, third information representing a plurality of patterns of combinations of the plurality of input instructions according to whether the at least one select input instruction is to be inputted or non-inputted to the intermediate module, and to provide, through the output interface, the third information as user-recognizable first image information.

8. The device according to claim 7, wherein the information provider is configured to generate, for each of the plurality of output instructions represented by the first information, fourth information as the third information, the fourth information representing a plurality of patterns of combinations of a number of the plurality of input instructions according to whether the at least one select input instruction is to be inputted or non-inputted to the intermediate module, the number of the plurality of input instructions causing a corresponding one of the plurality of output instructions, and to provide, through the output interface, the fourth information as user-recognizable second image information.

9. The device according to claim 7, wherein the intermediate module comprises a plurality of structural components, further comprising:
- a divider configured to divide, according to input information from the user-operable input interface, at least one function to be included in the intermediate module into, as a plurality of segmented functions, a plurality of functions each of which matches a corresponding one of combinations between one of the plurality of input instructions and one of the plurality of output instructions; and
- a communalization information obtainer configured to obtain, via the user-operable input interface, fifth information representing at least one commonalized group of segmented functions in a part of the plurality of segmented functions, the part of the plurality of segmented functions being response to a common one of the plurality of output instructions, the specified segmented functions in the at least one commonalized group communalizing at least one of the plurality of structural components of the intermediate module,
- wherein the information provider configured to generate, based on the fifth information obtained by the communalization information obtainer, for the at least one commonalized group, sixth information as the third information, the sixth information representing a plurality of patterns of combinations of a number of the plurality of input instructions according to whether the at least one select input instruction is to be inputted or non-inputted to the intermediate module, the number of the plurality of input instructions corresponding to a number of segmented functions included in the at least one commonalized group, and to provide, through the output interface, the sixth information as user-recognizable third image information.

10. The device according to claim 9, further comprising:
- a combination component obtainer configured to obtain a plurality of combination components each as one of the plurality of structural components, each of the plurality of combination components being shared by a combination of the number of segmented functions included in the at least one commonalized group;
- a single component obtainer configured to obtain a plurality of single components each as one of the plurality of structural components, each of the plurality of single components implementing at least one segmented function in the plurality of segmented functions, the at least one segmented function being not included in the at least one commonalized group;
- a management component obtainer configured to obtain, for each of the plurality of input instructions, a plurality of management components each as one of the plurality of structural components, each of the management components that manages at least one of the plurality of segmented functions, the at least one of the plurality of segmented functions being responsive to a corresponding one of the plurality of input instructions;
- an input/non-input information obtainer configured to obtain, via the input interface, seventh information representing whether the at least one select input information is to be inputted or non-inputted to the intermediate module,
- an extractor configured to extract, based on the seventh information obtained by the input/non-input information obtainer, a plurality of components of the intermediate module from the plurality of combination components, the plurality of single components, and the plurality of management components obtained by the respective combination component obtainer, single component obtainer, and management component obtainer,
- wherein the combination component obtainer is configured to obtain, for each of combinations of the plurality of input instructions according to whether the at least one select input instruction is to be inputted or non-inputted to the intermediate module, the plurality of combination components each of which is shared by the combination of the number of segmented functions included in the at least one commonalized group, each of the number of segmented functions corresponding to one input instruction included in a corresponding one of the combinations of the plurality of input instructions, and
- the extractor is configured to extract, based on the seventh information obtained by the input/non-input information obtainer, one of the plurality of combination components, the one of the plurality of combination components corresponding to at least one of the combinations of the plurality of input instructions to be actually inputted from the higher-level module to the intermediate module, one of the plurality of single components corresponding to each input instruction included in the at least one combination of the plurality of input instructions to be actually inputted from the higher-level module to the intermediate module, and one of the plurality of management components corresponding to each input instruction included in the at least one combination of the plurality of input instructions to be actually inputted from the higher-level module to the intermediate module.

11. A computer program product comprising:
- a non-transitory computer usable medium; and
- a set of computer program instructions embodied on the computer useable medium, the instructions including:
- a first instruction that causes a computer of a support device including a user-operable input interface and an output interface to obtain, via the user-operable input interface, first information representing a group of the plurality of input instructions and a group of the plurality of output instructions;
- a second instruction that causes the computer to obtain, via the user-operable input interface, second information representing at least one select input instruction in the plurality of input instructions represented by the first information, the at least one select input instruction being designed such that whether the at least one select input instruction is inputted or non-inputted to the intermediate module depends on a type of the higher-level module; and
- a third instruction that causes the computer to generate, based on the second information, third information representing a plurality of patterns of combinations of the plurality of input instructions according to whether the at least one select input instruction is to be inputted or non-inputted to the intermediate module, and to provide, through the output interface, the third information as user-recognizable image information.

* * * * *